(12) United States Patent
Lozano

(10) Patent No.: US 6,453,387 B1
(45) Date of Patent: Sep. 17, 2002

(54) FULLY ASSOCIATIVE TRANSLATION LOOKASIDE BUFFER (TLB) INCLUDING A LEAST RECENTLY USED (LRU) STACK AND IMPLEMENTING AN LRU REPLACEMENT STRATEGY

(75) Inventor: Leonel Lozano, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/415,132

(22) Filed: Oct. 8, 1999

(51) Int. Cl.[7] .............................................. G06F 12/00
(52) U.S. Cl. ........................ 711/133; 711/136; 711/159; 711/160; 711/205; 711/207
(58) Field of Search ................................ 711/118, 131, 711/133, 136, 159, 160, 205, 207

(56) References Cited

U.S. PATENT DOCUMENTS

| | | | | |
|---|---|---|---|---|
| 4,849,876 A | * | 7/1989 | Ozawa et al. ................ | 711/207 |
| 4,980,816 A | * | 12/1990 | Fukuzawa et al. ........... | 711/207 |
| 5,644,748 A | * | 7/1997 | Utsunomiya et al. ........ | 711/207 |
| 5,835,963 A | * | 11/1998 | Yoshioka et al. ............. | 365/49 |
| 6,092,172 A | * | 7/2000 | Nihimoto et al. ............ | 711/203 |

* cited by examiner

Primary Examiner—Matthew Kim
Assistant Examiner—Christian P. Chace
(74) Attorney, Agent, or Firm—Conley, Rose & Tayon, PC; B. Noël Kivlin

(57) ABSTRACT

A memory unit is presented employing a least recently used (LRU) replacement strategy. The memory unit may include a memory subunit for storing data items, circuitry coupled to the memory subunit for determining if the memory subunit contains a needed data item, and a control unit for controlling the storing of data items within the memory subunit. The memory subunit may include n entry locations where $n \geq 2$. The memory unit may generate a first signal indicating which of the n entry locations are currently in use (i.e., contain valid data items), and the circuitry coupled to the memory subunit may produce a second signal indicating which of the n entry locations contains the needed data item. A new data item to be stored within the memory subunit may be accompanied by a control signal identifying which of the n entry locations is to be used to store the new data item. The control unit may receive the first and second signals and produce the control signal dependent upon the first and second signals. The control signal may identify either: (i) one of the n entry locations not currently in use, or (ii) a least recently used one of the n entry locations. The memory unit may be a translation lookaside buffer (TLB). The TLB may be a dual port TLB. Also described are a cache unit including the TLB, a processor including the cache unit, and a computer system including the processor.

40 Claims, 9 Drawing Sheets

FULLY ASSOCIATIVE TRANSLATION LOOKASIDE BUFFER (TLB) INCLUDING A LEAST RECENTLY USED (LRU) STACK AND IMPLEMENTING AN LRU REPLACEMENT STRATEGY

BACKGROUND OF THE INVENTION

1. Field of the Invention

This invention relates to processors and computer systems, and more particularly to address translation memory systems used within computer systems and processors.

2. Description of the Related Art

A typical computer system includes a processor which reads and executes instructions of software programs stored within a memory system. In order to maximize the performance of the processor, the memory system must supply the instructions to the processor such that the processor never waits for needed instructions. There are many different types of memory from which the memory system may be formed, and the cost associated with each type of memory is typically directly proportional to the speed of the memory. Most modern computer systems employ multiple types of memory. Smaller amounts of faster (and more expensive) memory are positioned closer to the processor, and larger amounts of slower (and less expensive) memory are positioned farther from the processor. By keeping the smaller amounts of faster memory filled with instructions (and data) needed by the processor, the speed of the memory system approaches that of the faster memory, while the cost of the memory system approaches that of the less expensive memory.

Most modern computer systems also employ a memory management technique called "virtual" memory which allocates memory to software programs upon request. This automatic memory allocation effectively hides the memory hierarchy described above, making the many different types of memory within a typical memory system (e.g., random access memory, magnetic hard disk storage, etc.) appear as one large memory. Virtual memory also provides for isolation between different programs by allocating different physical memory locations to different programs running concurrently.

A typical modern processor includes a cache memory unit coupled between an execution unit and a bus interface unit. The execution unit executes software instructions. The cache memory unit includes a relatively small amount of memory which can be accessed very quickly. The cache memory unit is used to store instructions and data (i.e. data items) recently used by the execution unit, along with data items which have a high probability of being needed by the execution unit in the near future. Searched first, the cache memory unit makes needed data items readily available to the execution unit. When a needed data item is not found in the cache memory unit, the bus interface unit is used to fetch the needed data item from a main memory unit external to the processor. The overall performance of the processor is improved when needed data items are often found within the cache memory unit, eliminating the need for time-consuming accesses to the main memory unit.

Modern processors (e.g., x86 processors) support a form of virtual memory called "paging". Paging divides a physical address space, defined by the number of address signals generated by the processor, into fixed-sized blocks of contiguous memory called "pages". If paging is enabled, a "virtual" address is translated or "mapped" to a physical address. For example, in an x86 processor with paging enabled, a paging unit within the processor translates a "linear" (i.e., virtual) address produced by a segmentation unit to a physical address. If an accessed page is not located within the main memory unit, paging support constructs (e.g., operating system software) load the accessed page from secondary memory (e.g., magnetic disk) into main memory. In x86 processors, two different tables stored within the main memory unit, namely a page directory and a page table, are used to store information needed by the paging unit to perform the linear-to-physical (i.e., virtual-to-physical) address translations.

In order to reduce the number of required main memory unit accesses to retrieve information from the page directory and page table, a small cache memory system called a translation lookaside buffer (TLB) is typically used to store the most recently used virtual-to-physical address translations. As the amount of time required to access a virtual-to-physical address translation in the TLI is relatively small, overall processor performance is increased as needed address translations are often found in the readily accessible TLB.

In general, processor performance increases with the number of address translations (i.e., entries) in the TLB. When an entry corresponding to an input linear (i.e., virtual) address is found within the TLB, the TLB asserts a "HIT" signal. As the number of entries in the TLB increases, the time required to generate the HIT signal also increases. Any increase in the time required to generate the ST signal may increase the amount of time which must be allocated to address translation. Address translation may be on a critical timing path within the processor, thus increasing the number of TLB entries beyond a certain number may result in a reduction in processor performance.

Data items from main memory are stored within cache memory units (i.e., "caches") in groups called "blocks". Cache memory systems are distinguished from one another by where a given data block may be placed within or "mapped into" the caches. In a "direct mapped" cache, there is only one set of locations, collectively referred to as a "line", within the cache where a given block may be placed. In a "fully associative" cache, a given block may be placed in any line within the cache. In a "set associative" cache, a given block can only be placed in one of a restricted set of lines within the cache.

When a needed data item is not found within the cache, a new block containing the data item must be fetched from main memory and placed within a line of the cache. If all of the lines where the block may be placed (i.e., "candidate" lines) are filled with valid data, one of the candidate lines must be removed from the cache to make room for the new block. In the case of a direct-mapped cache, there is only one candidate line, and this line must be removed from the cache to make room for the block. In a fully associative or set-associative cache, there are multiple candidate lines. A replacement "policy" or "strategy" is used to select the candidate line to be removed from the cache in order to make room for the new block.

Common cache line replacement policies include random, least recently used (LRU), and first in first out (FIFO). In a random replacement strategy, one of the candidate lines is randomly selected for replacement. The LRU replacement strategy involves replacing the candidate line which has remained "unused" for the longest period of time. A candidate line is referred to as "unused" when a needed data item is not found within the candidate line. The FIFO replacement strategy replaces the candidate line which has been stored in the cache for the longest period of time.

For some cache sizes and configurations, employing the LRU replacement strategy may result in a greater number of needed data items being found within the cache. A TLB is one form of cache memory, therefore it would thus be desirable to have a TLB which implements an LRU replacement strategy.

SUMMARY OF THE INVENTION

The problems outlined above are in large part solved by a memory unit (e.g., a translation lookaside buffer or TLB) employing a least recently used (LRU) replacement strategy. The memory unit may include a memory subunit for storing data items, circuitry coupled to the memory subunit for determining if the memory subunit contains a needed data item, and a control unit for controlling the storing of data items within the memory subunit. The memory subunit may include, for example, n entry locations for storing data items where $n \geq 2$. The memory unit may generate a first signal indicating which of the n entry locations are currently in use (i.e., contain valid data items), and the circuitry coupled to the memory subunit may produce a second signal indicating which of the n entry locations contains the needed data item. When a needed data item is not found within the memory subunit, the data item may be obtained from another source and provided to the memory subunit as a new data item. The new data item may be accompanied by a control signal identifying which of the n entry locations is to be used to store the new data item.

The control unit may receive the first and second signals and produce the control signal dependent upon the first and second signals, The control signal may identify either: (i) one of the n entry locations not currently in use, or (ii) a least recently used one of the n entry locations. The least recently used one of the n entry locations is the entry location in which a needed data item has not been found for the longest period of time. If the first signal indicates that at least one of the n entry locations is not currently in use, the control signal may identify one of the n entry locations not currently in use. On the other hand, if all of the n entry locations are in use, the control signal may indicate the least recently used one of the n entry locations.

Each of the n entry locations may be identified by a unique identifier. For example, each of the n entry locations may be assigned a different number. The control unit may maintain a list of the unique identifiers of the n entry locations in chronological order of needed data items being found within each of the n entry locations. The control unit may maintain the list dependent upon the second signal, and use the list to determine the least recently used one of the n entry locations of the memory subunit.

In one embodiment of the memory unit, the memory subunit described above is a first memory subunit. The control unit includes a second memory subunit having n entry locations, where each of the n entry locations of the second memory subunit stores an identifier uniquely identifying a different one of the n entry locations of the first memory subunit. For example, each of the n entry locations of the first memory subunit may be assigned a different number, and each of the n entry locations of the second memory subunit may store a number assigned to a different one of the n entry locations of the first memory subunit. The control unit adjusts the relative locations of the identifiers within the n entry locations of the second memory subunit dependent upon the second signal such that the identifiers are maintained in chronological order of needed data items being found within each of the n entry locations of the first memory subunit. When a new data item is to be stored within the first memory subunit, and the first signal indicates that at least one of the n entry locations of the first memory subunit is not currently in use, the control signal identifies one of the n entry locations of the first memory subunit not currently in use. If, however, all of the n entry locations of the first memory subunit are in use, the control signal indicates the least recently used one of the n entry locations of the first memory subunit.

In one embodiment, the memory unit may be a translation lookaside buffer (TLB). The TLB may be used to store at least portions of virtual addresses and at least portions of physical addresses corresponding to the virtual addresses. The TLB may receive a virtual address and produce a physical address corresponding to the virtual address, thereby translating a virtual address to the corresponding physical address. The virtual address may include a higher-ordered "virtual page number" portion and a lower-ordered "offset" portion. The TLB may use stored data to produce a "translated" portion of a physical address from the virtual page number portion of a virtual address. The TLB may then append the offset (i.e., "untranslated") portion to the translated portion of the physical address in order to produce the physical address corresponding to the virtual address.

The TLB may include a first memory unit having a tag array, a data array, and a valid bit array. The tag array may have n entry locations for storing a b-bit virtual page number portion of a virtual address, where $2 \leq n < 2^b$. The b-bit virtual page number portion of a virtual address may be the highest-ordered b bits of the virtual address. In one specific example, n may be equal to 32 and b may be equal to 20. The data array may have n entry locations for storing a translated portion of a physical address, wherein each of the n entry locations of the data array is associated with a different one of the n entry locations of the tag array. Thus the first memory unit may have n lines each including a different tag array entry location and the associated data array entry location. The valid bit array may be used to store n valid bits, wherein each of the n valid bits is associated with a different one of the n lines of the first memory unit and has a value indicating if the contents of the associated line is valid. Thus each of the n valid bits has a value indicating if the contents of the associated entry location of the tag array and the corresponding contents of the data array are valid. The first memory unit may produce a first signal including the values of the n valid bits of the valid bit array.

The first memory unit may receive a new data item and a control signal. The new data item may include a virtual page number portion of a virtual address and a corresponding translated portion of a physical address. The control signal may identify one of the n lines of the first memory unit in which the new data item is to be stored. Thus the control signal may identify one of the n entry locations of the tag array in which the virtual page number portion of the virtual address is to be stored. The translated portion of a physical address of the new data item is to be stored in the data array entry location associated with the identified tag array entry location.

The TLB may also include circuitry coupled to the first memory unit for determining if the first memory unit contains a needed translated portion of a physical address. The circuitry may produce a second signal indicating which of the n entry locations of the tag array is associated with the entry location of the data array containing the needed translated portion of the physical address.

The TLB may also include a control unit. The control of the TLB may receive the first and second signals, and may produce the control signal dependent upon the first and second signals. The control unit may include a second memory unit including n entry locations, each storing an identifier uniquely identifying a different one of the n lines of the first memory unit (i.e., a different one of the n tag array entry location/data array entry location combinations). For example, each of the n lines of the first memory unit may be assigned a different number, and each of the n entry locations of the second memory unit may store a number assigned to a different one of the n lines of the first memory unit. The control unit may adjust the relative locations of the identifiers within the n entry locations of the second memory unit dependent upon the second signal such that the identifiers are maintained in chronological order of needed translated portions of physical addresses being found within each of the n lines of the first memory unit (i.e., within the entry location of the data array associated with each of the n entry locations of the tag array).

When a new data item is to be stored within the first memory unit and the first signal indicates that at least one of the n lines of the first memory unit is not currently in use (i.e., does not contain valid data), the control signal identifies one of the n lines of the first memory unit not currently in use as the line in which the new data item is to be stored. The control signal thus identifies one of the n entry locations of the tag array not currently in use as the entry location of the tag array in which the virtual page number portion of the virtual address of the new data item is to be stored. The translated portion of a physical address of the new data item is to be stored in the data array entry location associated with the identified tag array entry location.

When a new data item is to be stored within the first memory unit and the first signal indicates that all of the n lines of the first memory unit are in use, the control signal indicates a least recently used line of the first memory unit as the line in which the new data item is to be stored. The least recently line is the line in which a needed translated portion of a physical address has not been found for the longest period of time. The least recently line includes a least recently used entry location of the tag array and an associated least recently used entry location of the data array. The least recently used entry location of the data array is the entry location of the data array in which a needed translated portion of a physical address has not been found for the longest period of time. The control signal thus indicates the least recently used entry location of the tag array as the entry location of the tag array in which the virtual page number portion of the virtual address of the new data item is to be stored. The translated portion of the physical address of the new data item is to be stored in the least recently used data array entry location.

The control unit may include least recently used (LRU) logic, invalid entry locator logic, and selection logic. The LRU logic may be coupled to the second memory unit, and may receive the second signal. The LRU logic may adjust the relative locations of the identifiers within the n entry locations of the second memory unit dependent upon the second signal, and may produce an LRUE signal indicating the least recently used line of the first memory unit. The LRUE signal thus indicates the least recently used line within the first memory unit (i.e., a least recently used tag array entry location and a corresponding least recently used data array entry location). The invalid entry locator logic may receive the first signal and produce: (i) an EE signal indicating the presence or absence of at least one of the n lines within the first memory unit not currently in use, and (ii) an FIE signal identifying one of the n lines not currently in use. The selection logic may receive the LRUE, EE, and FIE signals, and produce either the LRUE signal or the FIE signal as the control signal dependent upon the EE signal. For example, the EE signal may be asserted if at least one of the n entry locations of the tag array is not currently in use. The selection logic may produce the LRUE signal when the EE signal is deasserted, and may produce the FIE signal when the EE signal is asserted.

The TLB described above may be dual ported, and may include a first port for receiving a first virtual address and a second port for receiving a second virtual address. The circuitry coupled to the memory unit may be a first set of circuitry for determining if the memory unit contains a needed translated portion of a physical address corresponding to the first virtual address. The first set of circuitry may produce the second signal, wherein the second signal indicates which of the n lines of the first memory unit contains the needed translated portion of the physical address corresponding to the first virtual address (i.e., which of the n entry locations of the tag array is associated with the data array set containing the needed translated portion of the physical address corresponding to the first virtual address).

The dual port TLB may also include a second set of circuitry coupled to the memory unit for determining if the memory unit contains a needed translated portion of a physical address corresponding to the second virtual address. The second set of circuitry may produce a third signal indicating which of the n lines of the first memory unit contains the needed translated portion of the physical address corresponding to the second virtual address (i.e., which of the n entry locations of the tag array is associated with the data array set containing the needed translated portion of the physical address corresponding to the second virtual address).

The control unit may receive the first, second, and third signals, and may produce the control signal dependent upon the first, second, and third signals. The control unit may include the second memory unit described above, and may adjust the relative locations of the identifiers within the n entry locations of the second memory unit dependent upon the second and third signals such that the identifiers are maintained in chronological order of needed translated portions of physical addresses being found within each of the n lines of the first memory unit (i.e., within the data array entry location associated with each of the n tag array entry locations).

As described above, when a new data item is provided to the memory unit and the first signal indicates that at least one of the n lines of the first memory unit is not currently in use, the control signal produced by the control unit identifies one of the n lines of the first memory unit not currently in use as the line in which the new data item is to be stored. As described above, the control signal thus identifies one of the n entry locations of the tag array not currently in use as the entry location of the tag array in which the tag portion of the partial virtual address of the new data item is to be stored. The translated portion of the physical address of the new data item is to be stored within the data array entry location associated with the identified tag array entry location.

If, on the other hand, all of the n entry locations of the tag array are in use, the control signal indicates a least recently used one of the n lines of the first memory unit (i.e., the line of the first memory unit in which a needed translated portion of a physical address has not been found for the longest period of time) as the line in which the new data item is to be stored. The control signal thus indicates a least recently used entry location of the tag array as the entry location of the tag array in which the tag portion of the partial virtual address of the new data item is to be stored. The translated portion of the physical address of the new data item is to be stored in the least recently used entry data array location associated with the least recently tag array entry location.

A cache unit may include a cache memory coupled to a TLB implementation of the memory unit described above. The cache unit may store multiple data items, and may be configured to produce a stored data item when provided with a virtual address corresponding to a physical address of the data item. The cache memory may be used to store the data items and corresponding physical addresses, and may be configured to produce one of the data items when provided with the corresponding physical address of the data item. The TLB may receive the virtual address, and may produce the physical address corresponding to the virtual address and provide the physical address to the cache memory.

A processor may include the cache unit described above, and a computer system may include such a processor. The computer system may also include a bus coupled to the processor, and a peripheral device coupled to the bus. For example, the bus may be a peripheral component interconnect (PCI) bus. In this case, the peripheral device may be, for example, a network interface card, a video accelerator, an audio card, a hard disk drive, or a floppy disk drive. Alternately, the bus may be an extended industry standard architecture (EISA)/industry standard architecture (ISA) bus, and the peripheral device may be, for example, a modem, a sound card, or a data acquisition card.

BRIEF DESCRIPTION OF THE DRAWINGS

Other objects and advantages of the invention will become apparent upon reading the following detailed description and upon reference to the accompanying drawings in which.

Figure 1:
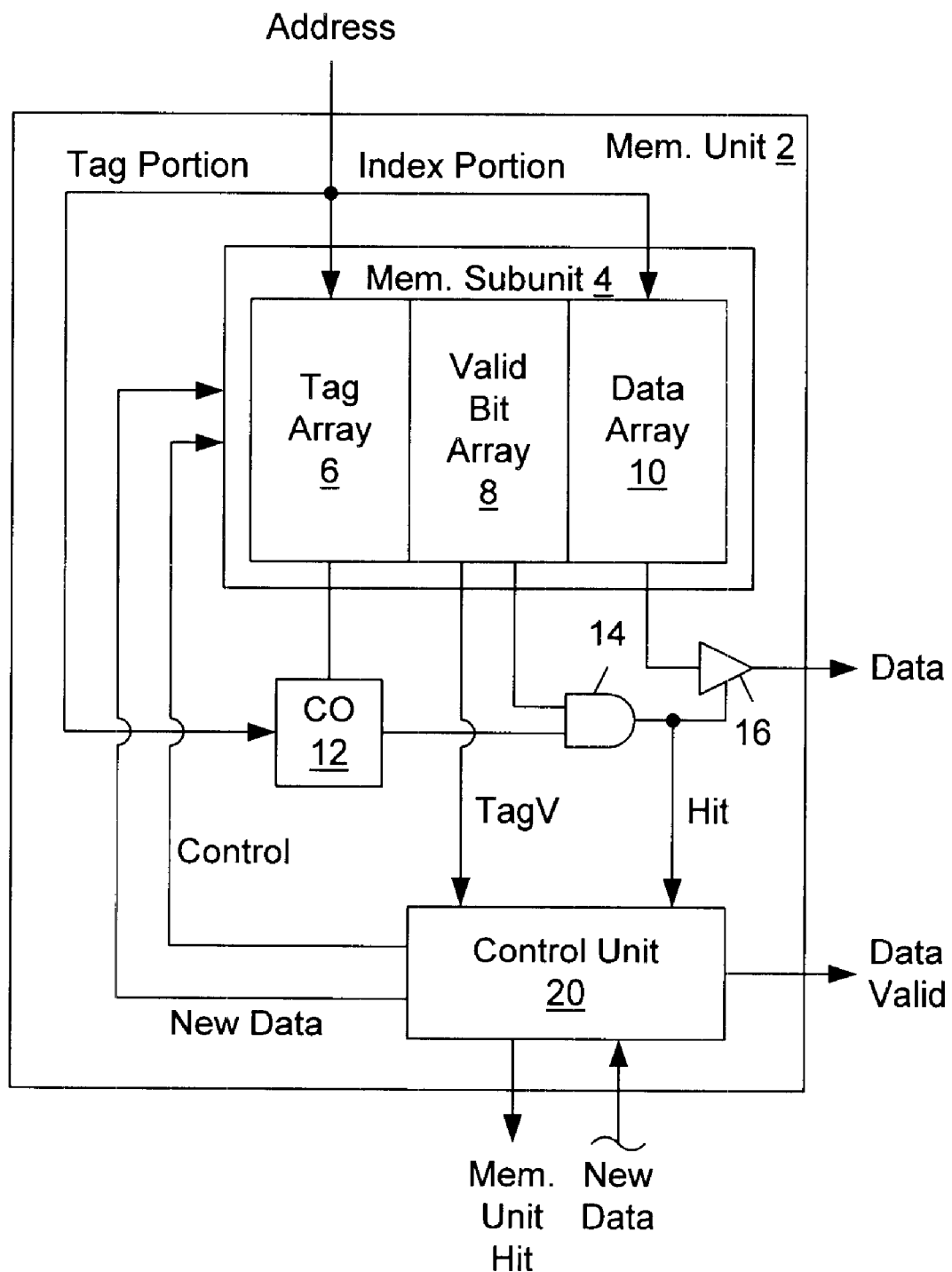
FIG. 1 is a block diagram of one embodiment of a memory unit used to store multiple data items and corresponding addresses, wherein the memory unit produces a stored data item when presented with the corresponding address, and wherein the memory unit includes a control unit for controlling the storing of data items and corresponding addresses within a memory subunit.

While the invention is susceptible to various modifications and alternative forms, specific embodiments thereof are shown by way of example in the drawings and will wherein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a block diagram of one embodiment of a memory unit 2. Memory unit 2 is used to store multiple data items and corresponding addresses. Memory unit 2 produces a stored data item in response to the corresponding address (i.e., a received address). Memory unit 2 may be a fully associative cache memory unit. Memory unit 2 includes a memory subunit 4 having a tag array 6, a valid bit array 8, and a data array 10. Tag array 6 has n entry locations, where $2 \leq n < 2^b$, and where b is the number of bits in a higher-ordered "tag" portion of the received address. Each of the entry locations within tag array 6 is used to store a "tag" portion of an address. Data array 10 includes n sets each having $2^m$ entry locations for storing data items, where m is the number of bits in a lower-ordered "index" portion of the received address, and where $m \geq 0$. Each of the n sets of entry locations within data array 10 is associated with a different one of the n entry locations within tag array 6. Data items occupying the $2^m$ entry locations of a given set within data array 10 are stored within memory unit 2 at the same time, and are removed from memory unit 2 at the same time. Each of the $2^m$ entry locations within a given set is accessed using the index portion of the received address.

Each of the n entry locations within tag array 6 and the corresponding $2^m$ entry locations of the corresponding set are called "lines". Valid bit array 8 stores n valid bits, each of which is associated with a different line within memory unit 2, and has a value indicating if the corresponding line is valid (i.e., if the corresponding line is currently in use). For example, a given valid bit may be a logic "0" when the contents of the corresponding line are invalid (i.e., when the corresponding line is not currently in use), and may be a logic "1" when the contents of the corresponding line are valid (i.e., when the corresponding line is currently in use).

Tag array 6 receives the higher-ordered tag portion of the received address. In response to the received tag portion, tag array 6 provides the contents of each of the entry locations within tag array 6 to a different comparator (e.g., comparator or CO 12). Memory unit 2 actually includes n comparators including comparator 12, wherein each of the n comparators is associated with a different entry location of tag array 6. Valid bit array 8 provides the value of each valid bit to a first input of a different AND logic unit (e.g., AND logic 14). Memory unit 2 actually includes n AND logic units including AND logic 14, wherein each of the n AND logic units is associated with a different valid bit within valid bit array 32.

If the contents of the entry location provided to comparator 12 by tag array 6 is identical to (i.e., matches) the tag portion of the received address, comparator 12 provides an asserted output signal (e.g., a logic "1") to a second input of AND logic 14.

At the same time tag array 6 receives the tag portion of the received address, data array 10 receives a lower-ordered "index" portion of the received address. Data array 10 responds to the index portion by providing the contents of each of the sets of data array 10 to the input of a different buffer (e.g., buffer 16). Memory unit 2 actually includes n buffers including buffer 16, wherein each of the n buffers is associated with a different set of data array 10. AND logic 14 produces an output signal coupled to a control terminal of buffer 16. If an entry location within tag array 6 is valid and the contents of the entry location match the tag portion of the received address, the output signal produced by AND logic 14 is asserted. In response to the asserted output signal of AND logic 14, buffer 16 produces the contents of the set within data array 10 as DATA. When m=0, the DATA produced by buffer 16 is a single data item corresponding to the received address. When m>0, additional circuitry (e.g., a multiplexer) may be included within memory unit 2 to select a single data item from the DATA produced by buffer 16 based upon the m bits of the index portion of the received address.

The output signals produced by the n AND logic units including AND logic 14 forms separate bits of a HIT signal. The HIT signal is provided to a control unit 20 which controls the operations of memory unit 2. If any one of the n bits of the HIT signal is asserted, control unit 20 produces an asserted DATA VALID signal and an asserted MEMORY UNIT HIT signal.

If none of the valid entry locations contain an address matching the received address, all n bits of the SIT signal are deasserted. In this case, memory unit 2 does not produce valid DATA, and control unit 20 deasserts the DATA VALID and MEMORY UNIT HIT signals. Control unit 20 may provide the deasserted MEMORY UNIT HIT signal to external circuitry. The external circuitry may provide the $2^m$ data items corresponding to the received address as NEW DATA to control unit 20.

Upon receiving the NEW DATA from the external circuitry, control unit 20 may provide the NEW DATA to memory subunit 4 along with a CONTROL signal indicating which of the lines of memory subunit 4 the tag portion of the received address and the $2^m$ data items of the NEW DATA are to be stored within. In response, memory subunit 4: (i) stores the tag portion of the received address within the entry location of tag array 6 corresponding to the selected line, and (ii) stores the $2^m$ data items of the NEW DATA within the $2^m$ entry locations of data array 10 corresponding to the selected line. Where m>0, the entry location of data array 10 where each of the $2^m$ data items of the NEW DATA is stored is uniquely identified by the m bits of the index portion of the received address.

Figure 2:
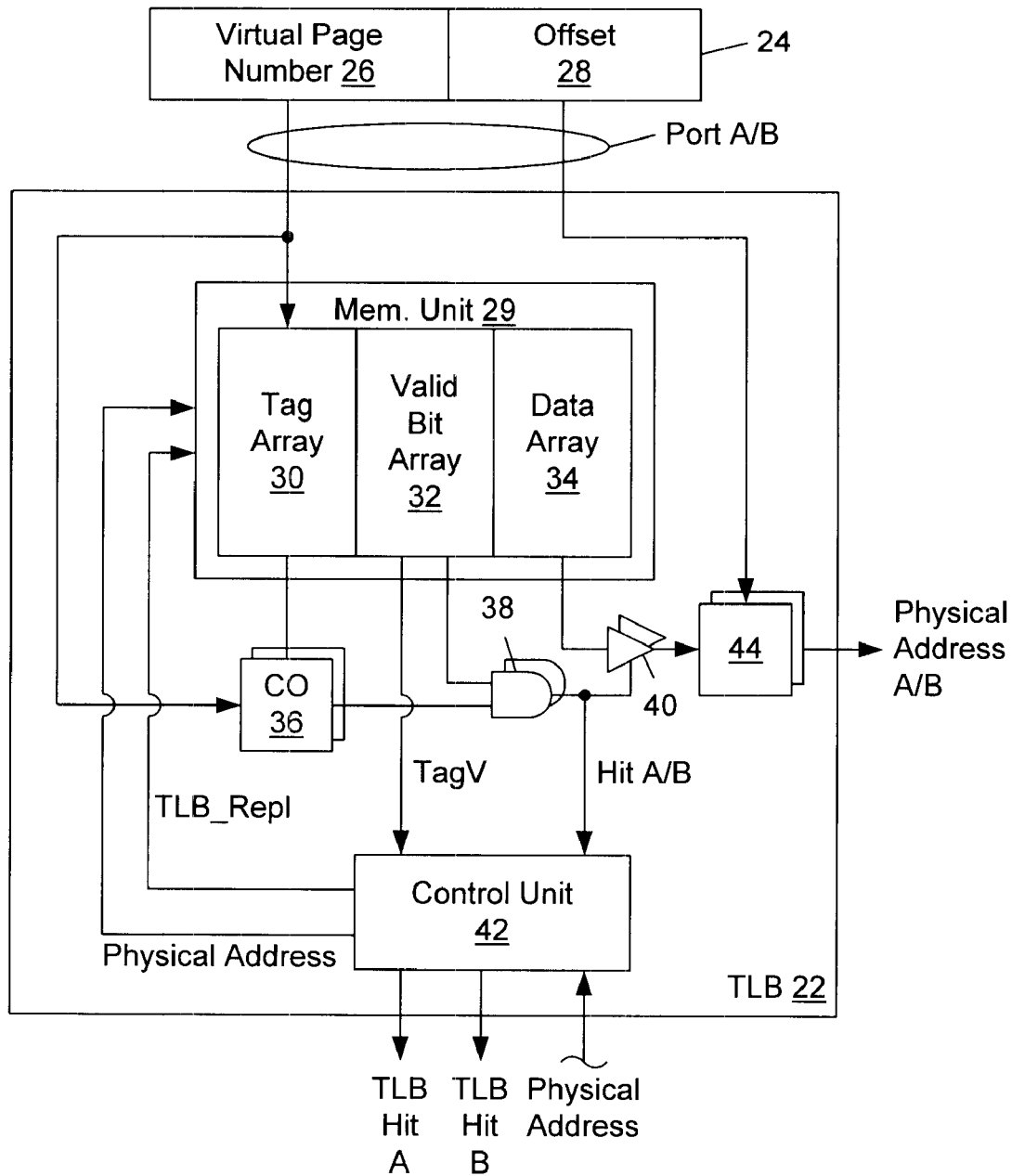
FIG. 2 is a block diagram a dual port, fully associative TLB embodiment of the memory unit of FIG. 1.

FIG. 2 is a block diagram of a dual port, fully associative TLB 22. TLB 22 is an embodiment of memory unit 2 of FIG. 1 where m=0. In general, TLB 22 is used to store virtual-to-physical address translations. A virtual address 24 received by TLB 22 includes a higher-ordered "virtual page number" portion 26 and a lower-ordered "offset" portion 28. TLB 22 uses stored data to produce a "translated" portion of a physical address from virtual page number portion 26. TLB 22 then appends offset (i.e., "untranslated") portion 28 to the translated portion of the physical address in order to produce the physical address corresponding to the virtual address.

TLB 22 includes a memory unit 29 including a tag array 30, a valid bit array 32, and a data array 34. Tag array 30 has n entry locations, where $2 \leq n < 2^b$, where b is the number of bits in virtual page number portion 26. In one specific example, n is equal to 32 and b is equal to 20. Each of the entry locations within tag array 30 is used to store a virtual page number portion of a virtual address. Data array 34 includes n entry locations for storing a translated portion of a physical address. Each of the n entry locations within data array 34 is associated with a different one of the n entry locations within tag array 30. Thus each virtual page number portion of a virtual address stored within tag array 30 has a corresponding translated portion of a physical address stored within data array 34.

Memory unit 29 has n lines each including a different one of the n entry locations of tag array 30 and the corresponding entry location within data array 34. Valid bit array 32 stores n valid bits, each of which is associated with a different line of memory unit 29, and has a value indicating if the data stored in the corresponding line is valid (i.e., if the corresponding line is currently in use). For example, a given valid bit may be a logic "0" when the contents of the corresponding entry location within tag array 30 and the corresponding entry location within data array 34 are invalid (i.e., if the corresponding entry location within tag array 30 and the corresponding entry location within data array 34 are not currently in use). The given valid bit may be a logic "1" when the contents of the corresponding entry location within tag array 30 and the corresponding entry location within data array 34 are valid (i.e., if the corresponding entry location within tag array 30 and the corresponding entry location within data array 34 are currently in use).

In the embodiment of FIG. 2, TLB 22 is a fully associative TLB. TLB 22 may be configured such that n=32. In this case, tag array 30 and data array 34 have 32 corresponding entry locations defining 32 different lines, and valid bit array 32 stores 32 valid bits, each of which is associated with a different one of the 32 lines.

TLB 22 has two ports for receiving virtual address 24; a first port A and a second port B. It is noted that different virtual addresses may be received simultaneously at ports A and B. Operation of TLB 22 with respect to port A will first be explained, followed by a description of the operation of TLB 22 with respect to port B.

Tag array 30 receives virtual page number portion 26 of virtual address 24 at port A. In response, memory unit 29 provides the contents of each of the entry locations within tag array 30 to a different comparator (e.g., comparator or CO 36). Fully associative TLB 22 includes a first group of n comparators including comparator 36, wherein each comparator of the first group is associated with a different entry location within tag array 30, and wherein the first group of comparators is associated with port A. Valid bit array 32 provides the value of each of the valid bits to a first input of a different AND logic unit (e.g., AND logic 38). Fully associative TLB 22 includes a first group of n AND logic units including AND logic 38, wherein each AND logic unit of the first group is associated with a different valid bit within valid bit array 32, and wherein the first group of n AND logic units is associated with port A. If the contents of the entry location of tag array 30 provided to comparator 36 is identical to (i.e., matches) virtual page number portion 26, comparator 36 provides an asserted output signal (e.g., a logic "1") to a second input of AND logic 38.

Memory unit 29 also provides the contents of each of the entry locations of data array 34 to an input of a different buffer (e.g., buffer 40). Fully associative TLB 22 includes a first group of buffers including buffer 40, wherein each buffer of the first group is associated with a different entry location within data array 34, and wherein the first group of buffers is associated with port A. AND logic 38 produces an output signal coupled to a control terminal of buffer 40. If the contents of the entry location of tag array 30 provided to comparator 36 is valid and matches virtual page number portion 26, the output signal produced by AND logic 38 is asserted. In response to the asserted output signal of AND logic 38, buffer 40 produces the contents of the corresponding entry location within data array 34 (i.e., the translated portion of the physical address corresponding to virtual page number portion 26 of virtual address 24 at port A).

The output signals produced by the first group of AND logic units including AND logic 38 forms separate bits of an n bit HIT A signal. The HIT A signal is provided to a control unit 42 which controls the operations of TLB 22. If any one of the n bits of the HIT A signal is asserted, control unit 42 produces an asserted TLB HIT A signal.

Concatenation logic 44 receives the translated portion of the physical address corresponding to virtual page number portion 26 of virtual address 24 at port A from buffer 40 along with offset portion 28 (i.e., the lower-ordered untranslated portion) of virtual address 24 at port A. Concatenation logic 44 concatenates the translated portion of the physical address and the untranslated portion of the physical address thereby producing PHYSICAL ADDRESS A. The untranslated portion of the physical address makes up the lower-ordered portion of the physical address. PHYSICAL ADDRESS A is the physical address corresponding to virtual address 24 at port A.

As described above, TLB 22 is also capable of receiving virtual address 24 at second port B. In this case, virtual page number portion 26 of virtual address 24 at port B is presented to tag array 30, and memory unit 29 responds by providing the contents of each of the entry locations of tag array 30 to a different comparator similar to comparator 36. Fully associative TLB 22 includes a second group of n comparators similar to comparator 36, wherein each comparator of the second group is associated with a different entry location within tag array 30, and wherein the second group of comparators is associated with port B. Valid bit array 32 provides the value of each of the valid bits to a first input of a different AND logic unit similar to AND logic 38. Fully associative TLB 22 includes a second group of n AND logic units similar to AND logic 38, wherein each AND logic unit of the second group is associated with a different valid bit within valid bit array 32, and wherein the second group of AND logic units is associated with port B. If the contents of the entry location of tag array 30 provided to the comparator similar to comparator 36 matches virtual page number portion 26, the comparator similar to comparator 36 provides an asserted output signal (e.g., a logic "1") to a second input of the AND logic unit similar to AND logic 38.

Memory unit 29 also provides the contents of each of the entry locations of data array 34 to an input of a different buffer similar to buffer 40. Fully associative TLB 22 includes a second group of n buffers similar to buffer 40, wherein each buffer of the second group is associated with a different entry location within tag array 30, and wherein the second group of buffers is associated with port B. The AND logic unit similar to AND logic 38 produces an output signal coupled to a control terminal of the buffer similar to buffer 40. If the contents of the entry location of tag array 30 provided to the comparator similar to comparator 36 is valid and matches virtual page number portion 26, the output signal produced by the AND logic unit similar to AND logic 38 is asserted. In response to the asserted output signal of the AND logic unit similar to AND logic 38, the buffer similar to buffer 40 produces the contents of the corresponding entry location within data array 34 (i.e., the translated portion of the physical address corresponding to virtual page number portion 26 of virtual address 24 at port B).

The output signals produced by the second group of AND logic units similar to AND logic 38 form separate bits of an n bit HIT B signal. The HIT B signal is provided to a control unit 42. If any one of the bits of the HIT B signal is asserted, control unit 42 produces an asserted TLB HIT B signal.

A second copy of concatenation logic 44 receives the translated portion of the physical address corresponding to virtual page number portion 26 of virtual address 24 at port B from the buffer similar to buffer 40 along with offset portion 28 (i.e., the lower-ordered untranslated portion) of virtual address 24 at port B. The second copy of concatenation logic 44 concatenates the translated portion of the physical address and the untranslated portion of the physical address thereby producing PHYSICAL ADDRESS B. The untranslated portion of the physical address makes up the lower-ordered portion of the physical address. PHYSICAL ADDRESS B is the physical address corresponding to virtual address 24 at port B.

With respect to port A, if the contents of the valid entry locations within tag array do not match virtual page number portion 26 of virtual address 24 at port A, the output signals produced by the first group of AND logic units including AND logic 38 are deasserted. In this case, the PHYSICAL ADDRESS A signal is not valid, and control unit 42 deasserts the TLB HIT A signal. Control unit 42 may provide the deasserted TLB HIT A signal to external circuitry. The external circuitry may perform the virtual-to-physical address translation and provide the resulting physical address corresponding to the virtual address at port A to control unit 42.

Upon receiving the physical address corresponding to the virtual address at port A from the external circuitry, control unit 42 may provide the translated portion of the physical address to memory unit 29 along with a TLB_REPL control signal indicating which of the n lines of memory unit 29 the virtual page number portion of the virtual address at port A and the corresponding translated portion of the physical address are to be stored within. In response, memory unit 29: (i) stores the virtual page number portion of the virtual address at port A within the entry location of tag array 30 corresponding to the selected line, and (ii) stores the translated portion of the physical address within the entry location of data array 34 corresponding to the selected line.

With respect to port B, if the contents of the valid entry locations within tag array 30 do not match virtual page number portion 26 of virtual address 24 at port B, the output signals produced by the second group of AND logic units similar to AND logic 38 are deasserted. The PHYSICAL ADDRESS B signal is not valid, and control unit 42 deasserts the TLB HIT B signal. Control unit 42 may provide the deasserted TLB HIT B signal to external circuitry. The external circuitry may perform the virtual-to-physical address translation and provide the resulting physical address corresponding to the virtual address at port B to control unit 42. Control unit 42 may provide the translated portion of the physical address to memory unit 29 along with a TLB_REPL control signal as described above in order to: (i) store the virtual page number portion of the virtual address at port B within an entry location of tag array 30 corresponding to the selected line, and (ii) store the corresponding translated portion of the physical address within the entry location of data array 34 corresponding to the selected line.

When valid bit array 32 provides the value of each of the valid bits to a first input of a different AND logic unit, valid bit array 32 also provides a TAGV signal to control unit 42. The TAGV signal includes the values of the valid bits associated with all of the entry locations within tag array 30. Where tag array 30 and data array 34 include n entry locations, the TAGV signal may be an n bit signal, wherein each of the n bits is associated with a different line of memory unit 29 and has a value indicating if the corresponding line is being used to store valid data (i.e., if the corresponding line is currently in use). Control unit 42 uses the TAGV signal as described below to implement an LRU replacement strategy to control the storing of data items within memory unit 29.

Figure 3:
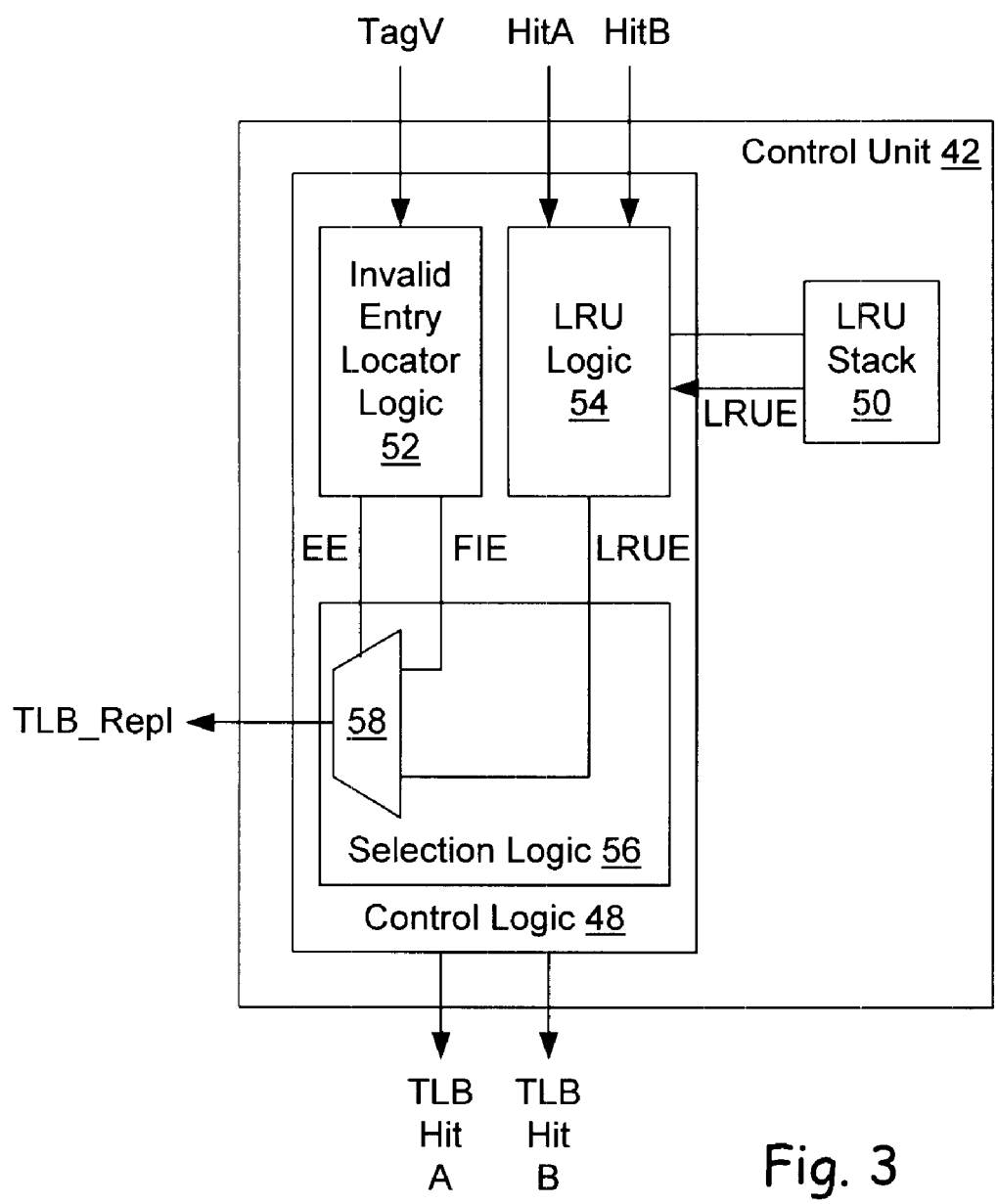
FIG. 3 is a block diagram of one embodiment of the control unit of the TLB of FIG. 2, wherein the control unit includes least recently used (LRU) logic coupled to an LRU stack.

FIG. 3 is a block diagram of one embodiment of control unit 42 of TLB 22 of FIG. 2. Control unit 42 includes control logic 48 coupled to a least recently used (LRU) stack 50. Where tag array 30 of TLB 22 includes n lines (i.e., n entry locations of tag array 30 and corresponding entry locations of data array 34), LRU stack 50 also includes n entry locations. Each entry location of LRU stack 50 stores a value identifying a different one of the n entry locations of tag array 30 of TLB 22. The values stored within LRU stack 50 are maintained in chronological order of "use" of the corresponding entry locations of tag array 30. An entry location within tag array 30 is "used" when the entry location contains a valid virtual page number portion of a virtual address presented to port A or port B of TLB 22, and the corresponding entry location of data array 34 contains the translated portion of the physical address corresponding to the virtual page number portion of the virtual address. Conversely, an entry location within tag array 30 is not used (i.e., is "unused") when the entry location does not contain the valid virtual page number portion of the virtual address presented to port A or port B of TLB 22, and the S corresponding entry location of data array 34 does not contain the translated portion of the physical address corresponding to the virtual page number portion of the virtual address. LRU stack 50 produces an LRUE signal identifying the least recently used entry location within tag array 30 of TLB 22. LRU stack 50 provides the LRUE signal to control logic 48.

Control logic 48 includes invalid entry locator logic 52, LRU logic 54, and selection logic 56. Invalid entry locator logic 52 receives the TAGV signal from valid bit array 32 and uses the TAGV signal to produce: (i) an FIE signal identifying the first invalid line within memory unit 29 of TLB 22 (i.e., the first invalid entry location of tag array 30 and corresponding entry location of data array 34), and (ii) an EE signal indicating the presence or absence of one or more invalid lines within memory unit 29 of TLB 22 (i.e., the presence or absence of one or more invalid entry locations of tag array 30 and corresponding invalid entry locations of data array 34). LRU logic 54 receives the HIT A and HIT B signals produced by the respective first and second groups of AND logic units of TLB 22, and uses the HIT A and HIT B signals to generate control signals coupled to LRU stack 50. The control signals control operations within LRU stack 50 such that the values stored within the entry locations of LRU stack 50 are maintained in chronological order of "use" of the corresponding entry locations within tag array 30 of TLB 22. LRU logic 54 receives the LRUE signal from LRU stack 50 and provides the LRUE signal to selection logic 56.

When tag array 30 of TLB 22 includes n entry locations, each of the entry locations may be numbered 0 through n−1. The FIE signal may be a n bit signal having a value identifying the lowest numbered (i.e., first) invalid entry location within tag array 30 of TLB 22. The EE signal may be a single bit having a logic value of "1" when there are one or more invalid (i.e., empty) entry locations within tag array 30 and a logic value of "0" when all of the entry locations within tag array 30 contain valid data (i.e., are valid).

Selection logic 56 includes a multiplexer 58 receiving the HE signal at a first input, the LRUE signal from LRU logic 54 at a second input, and the EE signal at a control input. Multiplexer 58 produces either the FIE signal or the LRUE signal as the TLB_REPL control signal at an output dependent upon the EE signal. Selection logic 48 provides the TLB_REPL control signal to memory unit 29.

Figure 4:
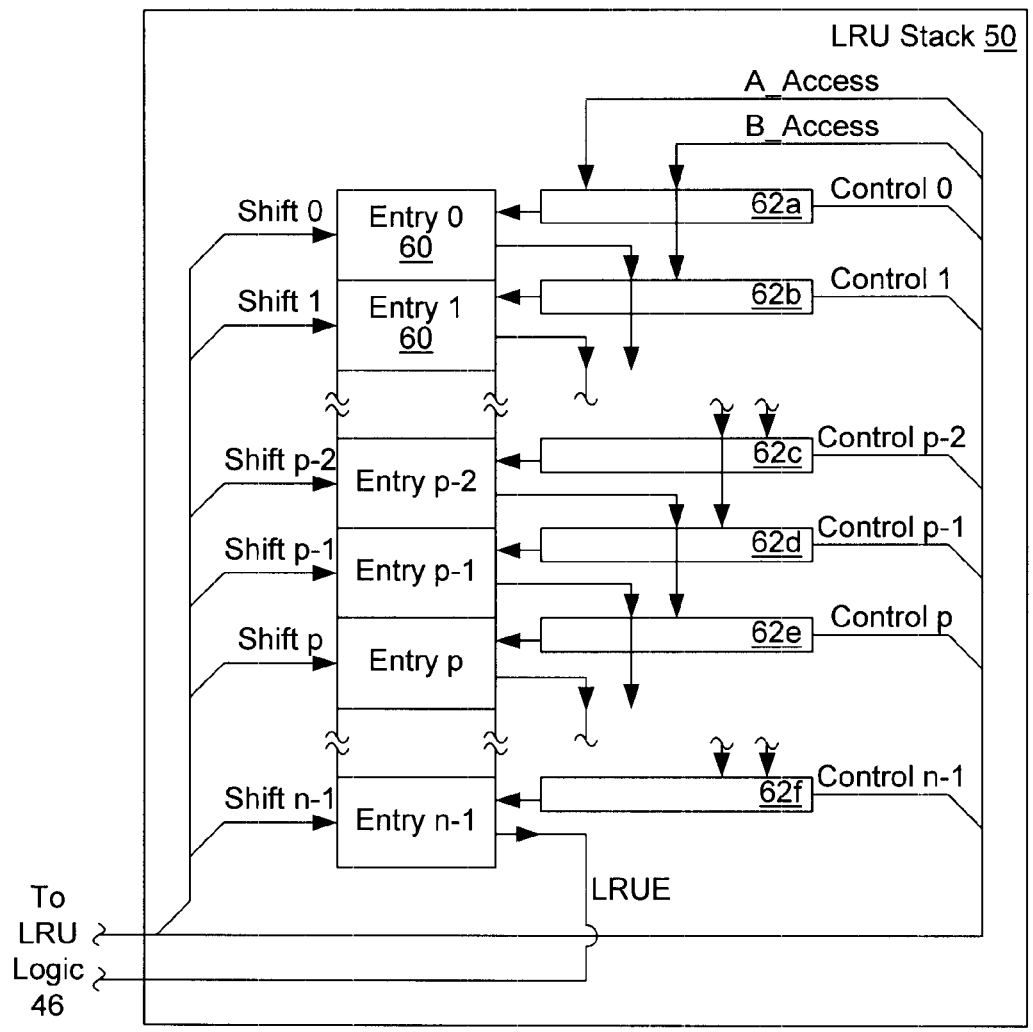
FIG. 4 is a block diagram of one embodiment of the LRU stack of FIG. 3, wherein the LRU stack includes multiple entry locations each coupled to a shift logic unit, and wherein the entry locations receive SHAFT signals from the LRU logic of FIG. 3 and the shift logic units receive CONTROL signals from the LRU logic of FIG. 3.

FIG. 4 is a block diagram of one embodiment of IRU stack 50. LRU stack 50 includes multiple entry locations 60, wherein the number of entry locations 60 corresponds to the number of entry locations within tag array 30 of TLB 22. For example, when tag array 30 has n entry locations, LRU stack 50 also has n entry locations. As described above, each entry location of LRU stack 50 stores a value identifying a different one of the entry locations of tag array 30 of TLB 22.

In the embodiment of FIG. 4, the n entry locations of LRU stack 50 are numbered from 0 to n−1. The entry locations of tag array 30 of TLB 22 are similarly numbered from 0 to n−1. Entry location 0 of LRU stack 50 stores the number of the most recently used entry location of tag array 30. Entry location 1 of LRU stack 50 stores the number of the second most recently used entry location of tag array 30. Entry location n−1 of LRU stack 50 stores the number of the least recently used entry location of tag array 30. As will be described in detail below, the values stored within the entry locations of LRU stack 50 are maintained in chronological order of use of the corresponding entry locations within tag array 30. The LRUE signal produced by LRU stack 50 is the contents of entry location n−1 of LRU stack 50.

LRU stack 50 also includes multiple shift logic units 62a–f, collectively referred to as shift logic units 62. Each of the shift logic units 62 is a temporary storage location for a value stored within entry locations 60. Each of the shift logic units 62 is coupled to a different one of the entry locations 60 of LRU stack 50. In FIG. 4, shift logic unit 62a is coupled to entry location 0, shift logic unit 62b is coupled to entry location 1, shift logic unit 62c is coupled to entry location p−2 (where $4 \leq p \leq n-2$), shift logic unit 62d is coupled to entry location p−1, shift logic unit 62e is coupled to entry location p, and shift logic unit 62f is coupled to entry location n−1. Each of the shift logic units 62 receives two input signals and a CONTROL signal from LRU logic 54, and provides one of the two input signals to the corresponding one of the entry locations 60 dependent upon the CONTROL signal. Each of the entry locations 60 is coupled to receive a different SHIFT signal from LRU logic 54, and stores the input signal provided by the corresponding one of the shift logic units 62 when the SHIFT signal is asserted.

Shift logic unit 62a receives an A_ACCESS input signal, a B_ACCESS input signal, and a CONTROL 0 control signal from LRU logic 54. The A_ACCESS signal identifies the entry location of tag array 30 containing the virtual page number portion of a virtual address at port A. The B_ACCESS signal similarly identifies the entry location of tag array 30 containing the valid virtual page number portion of a virtual address at port B.

Shift logic unit 62b receives the B_ACCESS signal and the contents of the entry location 0 as input signals, and a CONTROL 1 control signal from LRU logic 54. When the A_ACCESS and B_ACCESS signals are not identical, shift logic unit 62a produces the A_ACCESS signal as an output signal in response to the CONTROL 0 control signal, and provides the output signal to entry location 0. Entry location 0 receives a SHIFT 0 signal from LRU logic 54, and stores the A_ACCESS signal provided by shift logic unit 62a when the SHIFT 0 signal is asserted. Shift logic unit 62b produces the B_ACCESS signal as an output signal in response to the CONTROL 1 control signal, and provides the output signal to entry location 1. Entry location 1 receives a SHIFT 1 signal from LRU logic 54, and stores the B_ACCESS signal provided by shift logic unit 62b when the SHIFT 1 signal is asserted.

When the A_ACCESS and B_ACCESS signals are identical, shift logic unit 62a produces either the A_ACCESS signal or the B_ACCESS signal as an output signal in response to the CONTROL 0 control signal, and provides the output signal to entry location 0. Entry location 0 stores the signal provided by shift logic unit 62a when the SHIFT 0 signal is asserted. Shift logic unit 62b produces the contents of the entry location 0 as an output signal in response to the CONTROL 1 control signal, and provides the output signal to entry location 1. Entry location 1 stores the signal provided by shift logic unit 62b when the SHIFT 1 signal is asserted.

Regarding entry location q, where $3 \leq q \leq n-1$, the shift logic unit corresponding to entry location q receives the contents of entry locations q−1 and q−2 as input signals, and a CONTROL q control signal from LRU logic 54. The corresponding shift logic unit produces either the contents of entry location q−1 or the contents of entry location q−2 as an output signal dependent upon the CONTROL q control signal, and provides the output signal to entry location q. Entry location q receives a SHIFT q signal from LRU logic 54, and stores the signal provided by the corresponding shift logic unit when SHIFT q signal is asserted.

Figure 5:
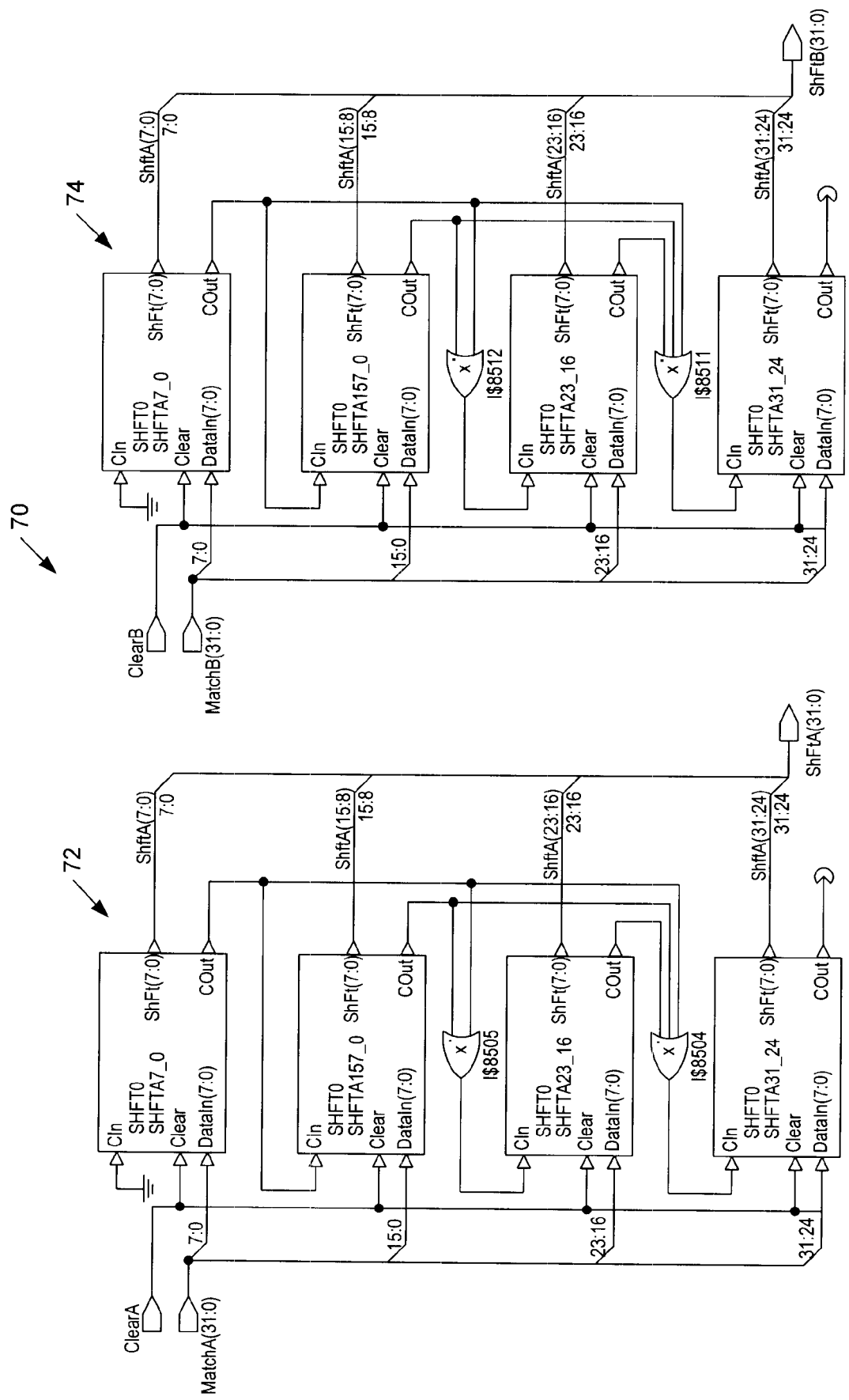
FIG. 5 is a first diagram of exemplary circuitry within the LRU logic of FIG. 3 which may be used to generate the CONTROL signals provided to the shift logic units of FIG. 4 and the SHIFT signals provided to the entry locations of FIG. 4.

Each of the entry locations 60 of LRU stack 50 also have comparison circuitry to identify the entry location of LRU stack 50 containing the number of an the entry location within tag array 30 containing the valid virtual page number portion of a virtual address present at port A or port B of TLB 22. FIG. 5 is a first diagram of exemplary circuitry 70 within LRU logic 54 (FIG. 3) which may be used to generate the CONTROL signals provided to the shift logic units 62 and the SHIFT signals provided to entry locations 60 of LRU stack 50 (FIG. 4). Circuitry 70 includes a first four identical logic blocks 72 and a second four identical logic blocks 74. First four identical logic blocks 70 are interconnected and used to generate a 32-bit signal SHFTA(3 1:0) from a CLEARA signal and a 32-bit MATCHA(31:0) signal. Each of the 32 bits of the MATCHA(31:0) signal is produced by the comparison circuitry of a corresponding entry location of LRU stack 50, and an asserted bit of the MATCHA (31:0) signal indicates that the entry location of LRU stack 50 producing the bit contains the number of the entry location within tag array 30 containing the valid virtual page number portion of a virtual address present at port A of TLB 22. The CLEARA signal may be asserted when none of the valid entry locations of tag array 30 contain the virtual page number portion of a virtual address present at port A of TLB 22.

Second four identical logic blocks 74 are interconnected and used to generate a 32-bit SBFTB(31:0) signal from a CLEARB signal and a 32-bit signal MATCHB(31:0). Each of the 32 bits of the MATCHB(31:0) signal is produced by the comparison circuitry of a corresponding entry location of LRU stack 50, and an asserted bit of the MATCHB(31:0) signal indicates that the entry location of LRU stack 50 producing the bit contains the number of the entry location within tag array 30 containing the valid virtual page number portion of a virtual address present at port B of TLB 22. The CLEARB signal may be asserted when none of the valid entry locations within tag array 30 contain the virtual page number portion of a virtual address present at port B of TLB 22.

Figure 6:
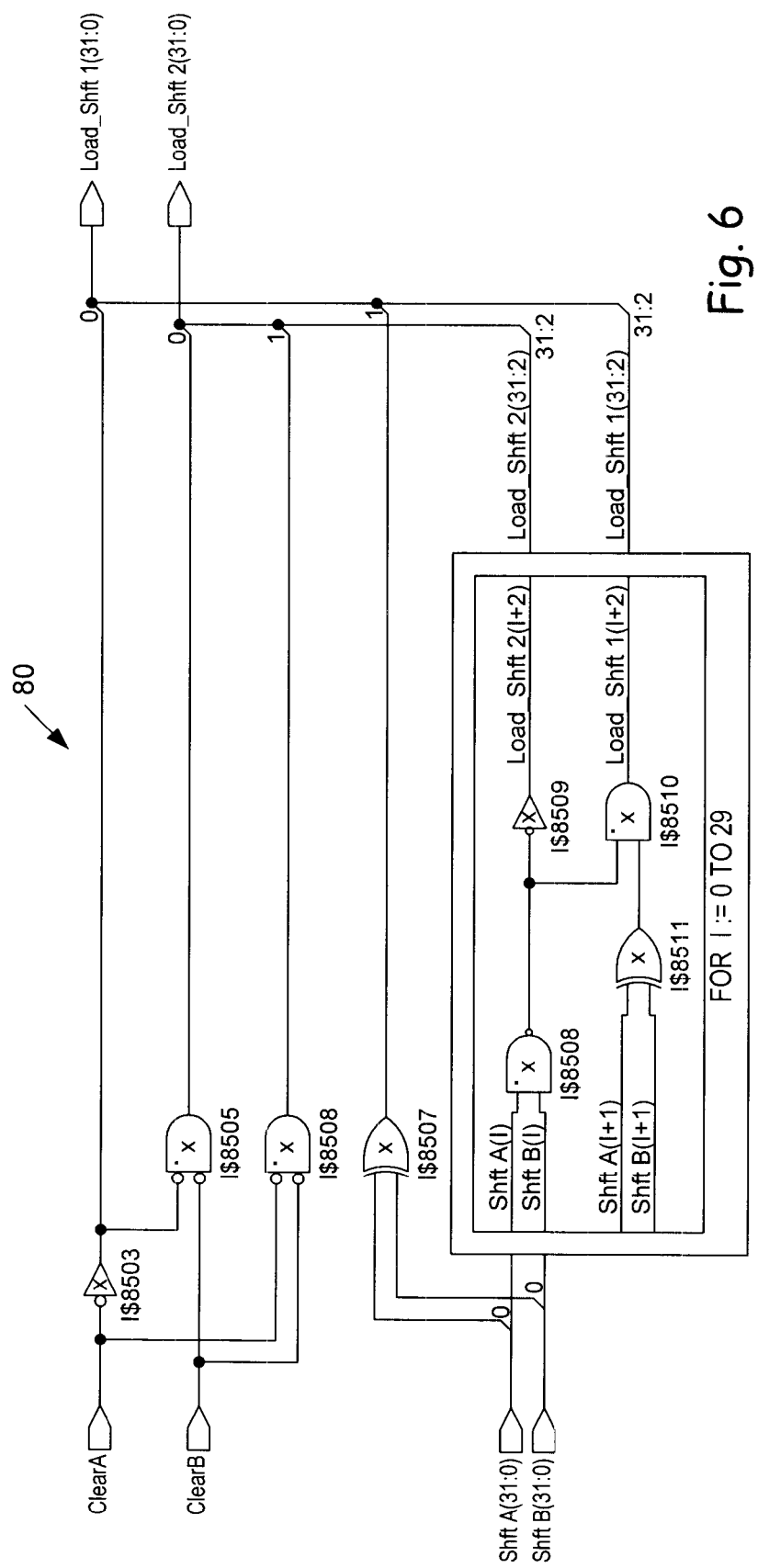
FIG. 6 is a second diagram of exemplary circuitry within the LRU logic of FIG. 3 which may be used to generate the CONTROL signals provided to the shift logic units of FIG. 4 and the SHIFT signals provided to entry locations of FIG. 4.

FIG. 6 is a second diagram of exemplary circuitry 80 within LRU logic 54 (FIG. 3) which may be used to generate the CONTROL signals provided to the shift logic units 62 and the SHIFT signals provided to entry locations 60 of LRU stack 50 (FIG. 4). Circuitry 80 produces a 32-bit LOAD_SHFT1(31:0) signal and a 32-bit LOAD_SHFF2 (31:0) signal from the CLEARA signal, the CLEARB signal, the SHFFA(31:0) signal, and the SHFTB(31:0) signal. Each bit of the LOAD_SHFT1(31:0) signal is a different CONTROL signal provided to the shift logic units in LRU stack 50 (FIG. 4), and each bit of the LOAD_SHFT2(31:0) signal may be a different SHIFT signal provided to the entry locations of LRU stack 50.

Figure 7:
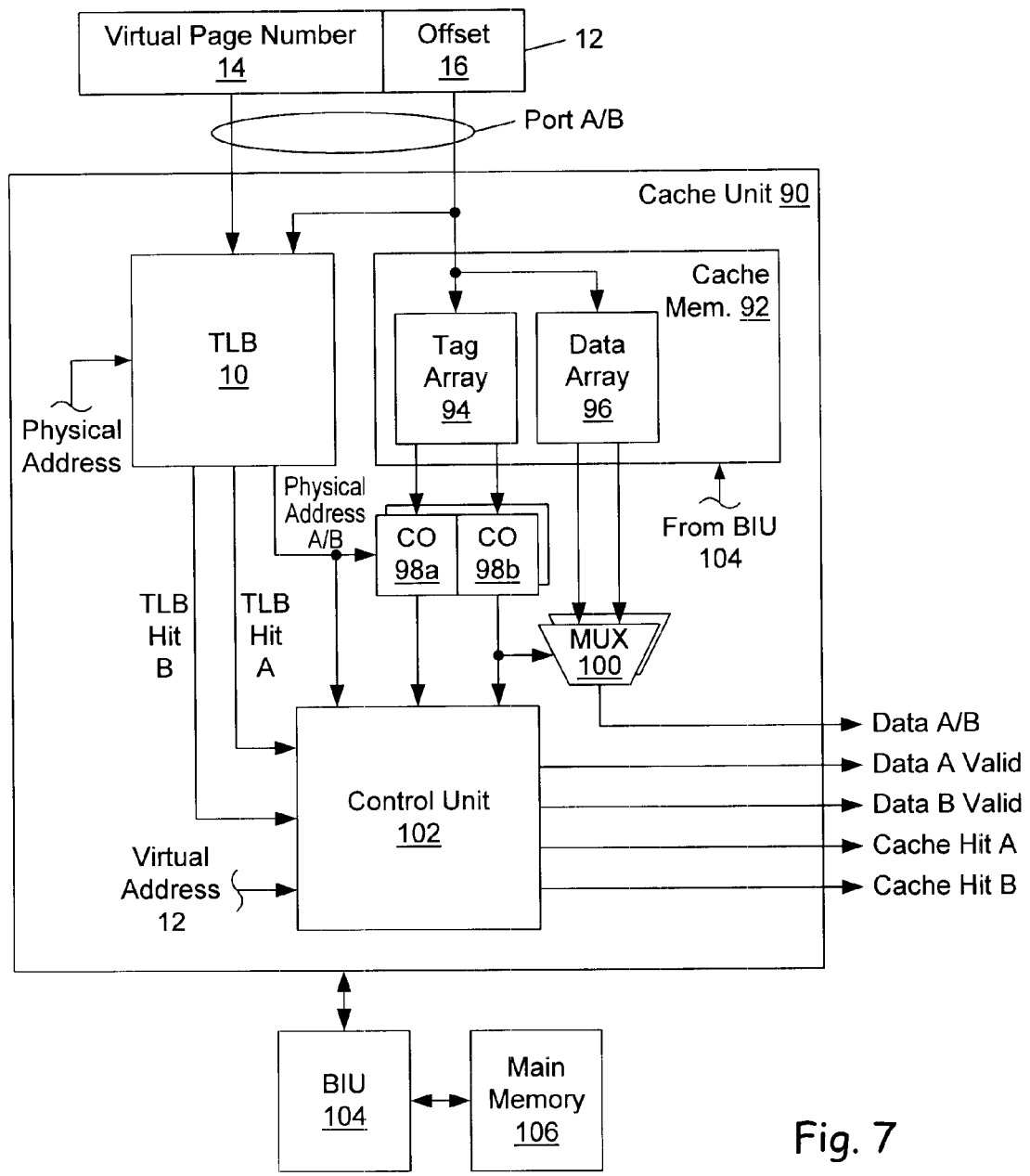
FIG. 7 is a block diagram of one embodiment of a dual port cache unit including the dual port TLB of FIGS. 2–6.

FIG. 7 is a block diagram of one embodiment of a dual port cache unit 90 including dual port TLB 22 of FIGS. 2–6. Cache unit 90 may be used to store, for example, instructions and/or data (i.e., "data items") recently used or likely to be needed by a processor coupled to cache unit 90. In addition to TLB 22, cache unit 90 includes a cache memory 92. Cache memory 92 includes a tag array 94 for storing physical address "tags", and a data array 96 for storing the data items. Each data item stored in data array 96 has a corresponding physical address "tag" stored in tag array 94.

Cache unit 90 has two ports for receiving virtual address 24; a first port A and a second port B. Port A of cache unit 90 may be coupled to port A of TLB 22 such that TLB 22 receives virtual address 24 presented to port A of cache unit 70 at port A of TLB 22. Similarly, port B of cache unit 90 may be coupled to port B of TLB 22 such that TLB 22 receives virtual address 24 presented to port B of cache unit 70 at port B of TLB 22. It is noted that different virtual addresses may be received simultaneously at ports A and B of cache unit 90 and TLB 22. Operation of cache unit 90 with respect to port A will first be explained, followed by a description of the operation of cache unit 90 with respect to port B.

Virtual address 24 presented to port A of cache unit 90 may be received at port A of TLB 22. As described above, if the contents of a valid entry location within tag array 30 matches virtual page number portion 26, data array 34 produces the translated portion of the physical address corresponding to virtual page number portion 26 of virtual address 24. Concatenation logic 44 within TLB 22 concatenates the translated portion of the physical address with offset portion 28 of virtual address 24 (i.e., the untranslated portion of the physical address) thereby producing the PHYSICAL ADDRESS A signal which is the physical address corresponding to virtual address 24 at port A of cache unit 90. TLB 22 also produces the asserted TLB HIT A signal as described above.

At the same time virtual address 24 is provided to port A of TLB 22, a lower-ordered "index" portion of the offset portion of virtual address 24 is provided to tag array 94 and data array 96 within cache memory 92. In the embodiment of FIG. 7, cache memory 92 is a two-way set associative cache structure. The index portion of the offset portion of virtual address 24 at port A is used as an index into tag array 94. As a result, tag array 94 produces two physical address "tags". One of the two physical address tags is provided to a comparator (CO) 98a, and the other physical address tag is provided to a comparator 98b. Comparators 98a–b are associated with port A of cache unit 90. The index portion of the offset portion of virtual address 24 at port A is also used as an index into data array 96. As a result, data array 96 produces two data items. The two data items are provided to different inputs of a multiplexer (MUX) 100 associated with port A.

The PHYSICAL ADDRESS A signal produced by TLB 22 is provided to comparators 98a–b, where the PHYSICAL ADDRESS A signal is the physical address corresponding to virtual address 24 at port A of cache unit 90. If the PHYSICAL ADDRESS A signal provided by TLB 22 matches one of the physical address tags provided by tag array 94 of cache memory 92, the corresponding comparator 98 produces an asserted output signal. The output signal produced by comparator 98a is provided to control unit 102 which controls the operations of cache unit 90. The output signal produced by comparator 98b is provided to control unit 102 and to a control input of multiplexer 100. When the output signal produced by comparator 98b is asserted, multiplexer 100 produces the data item from data array 76 corresponding to the physical address tag provided to comparator 98b as an output DATA A signal. On the other hand, when the output signal produced by comparator 98b is deasserted, multiplexer 100 produces the data item from data array 76 corresponding to the physical address tag provided to comparator 98a as an output DATA A signal.

In response to the TLB HIT A signal and an asserted output signal of either comparator 98a or comparator 98b, control unit 82 produces an asserted DATA A VALID output signal indicating that the DATA A signal produced by multiplexer 100 is valid, and asserts a CACHE HIT A signal indicating the data item corresponding to virtual address 24 at port A was found in cache memory 92.

Regarding the operation of cache unit 90 with respect to port B, virtual address 24 presented to port B of cache unit 90 may be received at port B of TLB 22. As described above, if the contents of a valid entry location within tag array 30 matches virtual page number portion 26, data array 34 produces the translated portion of the physical address corresponding to virtual page number portion 26 of virtual address 24. Concatenation logic 44 within TLB 22 concatenates the translated portion of the physical address with offset portion 28 of virtual address 24 (i.e., the untranslated portion of the physical address) thereby producing the PHYSICAL ADDRESS B signal which is the physical address corresponding to virtual address 24 at port B of cache unit 90. TLB 22 also produces the asserted TLB HIT B signal as described above.

At the same time virtual address 24 is provided to port B of TLB 22, the lower-ordered index portion of the offset portion of virtual address 24 is provided to tag array 94 and data array 96 within cache memory 92. The index portion of the offset portion of virtual address 24 at port B is used as an index into tag array 94. As a result, tag array 94 produces two physical address tags. One of the two physical address tags is provided to a port B comparator similar to comparator 98a. The other physical address tag is provided to a port B comparator similar to comparator 98b. The index portion of the offset portion of virtual address 24 at port B is also used as an index into data array 96. As a result, data array 96 produces two data items. The two data items are provided to different inputs of a port B multiplexer similar to multiplexer 100.

The PHYSICAL ADDRESS B signal produced by TLB 22 is provided to the port B comparator similar to comparator 98a and the port B comparator similar the comparator 98b. As described above, the PHYSICAL ADDRESS B signal is the physical address corresponding to virtual address 24 at port B of cache unit 90. If the PHYSICAL ADDRESS B signal matches one of the physical address tags provided by tag array 94 of cache memory 92, the corresponding port B comparator produces an asserted output signal. The output signals produced by the port B comparators are provided to control unit 102. In addition, the output signal produced by the port B comparator similar to comparator 98b is provided to a control input of the port B multiplexer. When the output signal produced by the port B comparator similar to comparator 98b is asserted, the port B multiplexer produces the data item from data array 76 corresponding to the physical address tag provided to the port B comparator similar to comparator 98b as an output DATA B signal. On the other hand, when the output signal produced by the port B comparator similar to comparator 98b is deasserted, the port B multiplexer produces the data item from data array 76 corresponding to the physical address tag provided to the port B comparator similar to comparator 98a as the output DATA B signal.

In response to the TLB HIT B signal and an asserted output signal of either of the port B comparators, control unit 102 produces an asserted DATA B VALID output signal indicating that the DATA B signal produced by the port B multiplexer is valid, and asserts a CACHE HYF B signal indicating the data item corresponding to virtual address 24 at port B was found in cache memory 92.

In the embodiment of FIG. 7, cache unit 90 is coupled to a bus interface unit (BIU) 104, and BIU 104 is coupled to a main memory 106. Main memory 106 is configured to store data items. Various tables used to implement a virtual memory system (e.g., a page directory and a page table) may be stored within main memory 106. Cache unit 90 and BIR 104 may be located within a processor, and BIU 104 may perform data transfers between the processor and main memory 106.

Regarding the operation of cache unit 90 with respect to port A, If TLB 22 is unable to produce the physical address corresponding to virtual address 24 at port A, the TLB HIT A signal produced by TLB 22 is deasserted. Control unit 102 may access the virtual memory system tables stored within main memory 106 via BIU 104, use information within the virtual memory system tables to translate virtual address 24 to a corresponding physical address, and provide the resulting physical address to TLB 22. Alternately, control unit 102 may forward virtual address 24 to BIU 104. BIU 104 may access the virtual memory system tables stored within main memory 106, perform the virtual-to-physical address translation, and provide the resulting physical address to TLB 22. In either case, TLB 22 stores virtual page number portion 26 of virtual address 24 within a selected entry location of tag array 30, and store the resultant physical address in an entry location of data array 34 corresponding to the selected entry location of tag array 30. TLB 22 may then assert the TLB HIT A signal, and provide the PHYSICAL ADDRESS A signal to comparators 98a–b.

If the PHYSICAL ADDRESS A signal produced by TLB 22 does not match one of the physical address tags provided by tag array 94 of cache memory 92, control unit 102 may submit a read request to BIU 104, providing the PHYSICAL ADDRESS A signal produced by TLB 22. BIU 104 may then read the data item from main memory 106. BIU 104 may forward the data item directly to cache memory 92 as indicated in FIG. 7. Cache memory 92 may store a tag portion of the physical address of the data item (i.e., a tag portion of the PHYSICAL ADDRESS A signal) within tag array 94, and store the corresponding data item retrieved from main memory 106 within data array 96. Cache memory 92 may also forward the tag portion of the physical address to either comparator 98a or 98b, and forward the stored data item to an input of multiplexer 100. As a result, the comparator to which the stored physical address is provided asserts the output signal, multiplexer 100 produces the DATA A signal including the stored data item, and control unit 102 asserts the CACHE HIT A signal.

Regarding the operation of cache unit 90 with respect to port B, If TLB 22 is unable to produce the physical address corresponding to virtual address 24 at port B, the TLB HIT B signal produced by TLB 22 is deasserted. Control unit 102 may access the virtual memory system tables stored within main memory 106 via BIU 104, use information within the virtual memory system tables to translate virtual address 24 to a corresponding physical address, and provide the resulting physical address to TLB 22. Alternately, control unit 102 may forward virtual address 24 to BIU 104. BIU 104 may access the virtual memory system tables stored within main memory 106, perform the virtual-to-physical address translation, and provide the resulting physical address to TLB 22. In either case, TLB 22 may store a tag portion of virtual address 24 within a selected entry location of tag array 30, and store the resultant physical address in an entry location of data array 34 corresponding to the selected entry location of tag array 30. TLB 22 may then assert the TLB HIT B signal, and provide the PHYSICAL ADDRESS B signal to the port B comparators.

If the PHYSICAL ADDRESS B signal produced by TLB 22 does not match one of the physical address tags provided by tag array 94 of cache memory 92, control unit 102 may submit a read request to BIU 104, providing the PHYSICAL ADDRESS B signal produced by TLB 22. BIU 104 may then read the data item from main memory 106. BIU 104 may forward the data item directly to cache memory 92 as indicated in FIG. 7. Cache memory 92 may store a tag portion of the physical address of the data item (i.e., a tag portion of the PHYSICAL ADDRESS B signal) within tag array 94, and store the corresponding data item retrieved from main memory 106 within data array 96. Cache memory 92 may also forward the tag portion of the physical address to either the port B comparator similar to comparator 98a or the port B comparator similar to comparator 98b, and forward the stored data item to an input of the port B multiplexer. As a result, the port B comparator to which the stored physical address is provided asserts the output signal, the port B multiplexer produces the DATA B signal including the stored data item, and control unit 102 asserts the CACHE HIT B signal.

Figure 8:
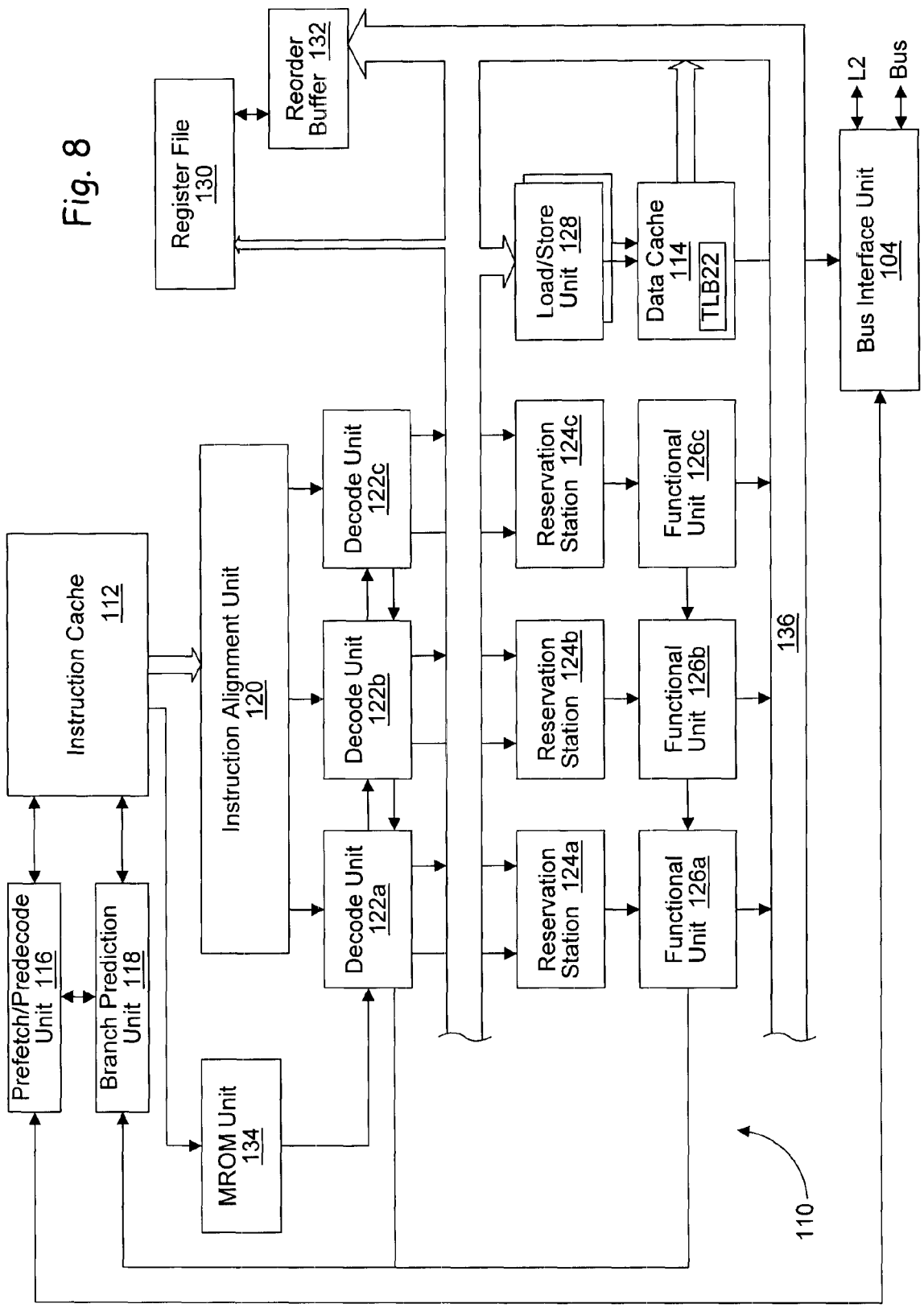
FIG. 8 is a block diagram of one embodiment of a processor including an instruction cache and a data cache, wherein both the instruction cache and the data cache include the dual port TLB of FIGS. 2–6.

FIG. 8 is a block diagram of one embodiment of a processor 110 including an instruction cache 112 and a data cache 114. Data cache 114 includes TLB 22 described above. Other embodiments of processor 110 are possible and contemplated. Processor 110 also includes BIU 104, a prefetch/predecode unit 116, a branch prediction unit 118, an instruction alignment unit 120, multiple decode units 122A–122C, reservation stations 124A–104C, and functional units 126A–106C, two load/store units 128, a register file 130, a reorder buffer 132, and a microcode read only memory (MROM) unit 134. Multiple result buses 136 are used to transport results produced by functional units 126 to load/store units 128. Elements referred to herein with a particular reference number followed by a letter will be collectively referred to by the reference number alone. For example, decode units 122A–122C will be collectively referred to as decode units 122.

Data cache 114 may be an instance of cache unit 90, thus data cache 114 may be dual ported. Dual port TLB 22 within data cache 114 may be used to store a relatively small number of virtual-to-physical address translations as described above. A virtual address of a needed data item may be presented to port A and/or port B. Dual port TLB 22 may produce the physical address corresponding to the virtual address at port A and/or B, and provide the physical address to a physically-tagged cache memory (e.g., cache memory 92) within data cache 114. If the needed data item is not stored within the cache memory, the physical address produced by TLB 22 may be used to retrieve the needed data item from either the L2 cache or main memory 106 via BIU 104. Data cache 114 may have a first port A coupled to one of the load/store units 128 a second port B coupled to the other load/store unit 128.

Prefetch/predecode unit 116 is coupled to BIU 104, instruction cache 112, and branch prediction unit 118. Branch prediction unit 118 is coupled to instruction cache 112, decode units 122, and functional units 126. Instruction cache 112 is further coupled to MROM unit 134 and instruction alignment unit 120. MROM unit 134 is coupled to decode units 122. Instruction alignment unit 120 is in turn coupled to decode units 122. Each decode unit 122A–122C is coupled to load/store units 128 and to respective reservation stations 124A–124C. Reservation stations 124A–124C are further coupled to respective functional units 126A–126C. Additionally, decode units 122 and reservation stations 124 are coupled to register file 130 and reorder buffer 132. Functional units 126 are coupled to load/store units 128, register file 130, and reorder buffer 132. Data cache 114 is coupled to load/store units 128 and BIU 104. BIU 104 is coupled to a level 2 (L2) cache and a bus. Main memory 106 may be coupled to the bus, and thus to BIU 104 via the bus.

Prefetch/predecode unit 116 prefetches instructions (i.e., fetches instructions before they are needed) from either the L2 cache or main memory 106 via BIU 104, and stores the prefetched instructions within instruction cache 112. Instruction cache 112 is a high speed cache memory for storing a relatively small number of instructions. Instructions stored within instruction cache 112 are fetched by instruction alignment unit 120 and dispatched to decode units 122. In one embodiment, instruction cache 112 is configured to store up to 64 kilobytes of instructions in a two-way set associative structure having multiple lines with 32 bytes in each line, wherein each byte includes 8 bits. Alternatively, any other desired configuration and size may be employed. For example, it is noted that instruction cache 112 may be implemented as a fully associative, set associative, or direct mapped configuration.

Prefetch/predecode unit 116 may employ a variety of prefetch schemes. As prefetch/predecode unit 116 stores prefetched instructions within instruction cache 112, prefetch/predecode unit 116 may generate three predecode bits for each byte of the instructions: a start bit, an end bit, and a functional bit. The predecode bits may form tags indicative of the boundaries of each instruction. The predecode tags may also convey additional information such as whether a given instruction can be decoded directly by decode units 122 or whether the instruction is executed by invoking a microcode procedure controlled by MROM unit 134. Prefetch/predecode unit 116 may be configured to detect branch instructions and to store branch prediction information corresponding to the branch instructions within branch prediction unit 118. Other embodiments may employ any suitable predecode scheme.

Processor 110 may execute instructions from a variable byte length instruction set. A variable byte length instruction set is an instruction set in which different instructions may occupy differing numbers of bytes. An exemplary variable byte length instruction set is the x86 instruction set.

In an exemplary predecode encoding of instructions from a variable byte length instruction set, the start bit for a first byte of an instruction is set, and the end bit for a last byte of the instruction is also set. Instructions which may be directly decoded by decode units 122 will be referred to as "fast path" instructions, and the remaining x86 instructions will be referred to as MROM instructions. For fast path instructions, the functional bit is set for each prefix byte included in the instruction, and is cleared for other bytes. For MROM instructions, the functional bit is cleared for each prefix byte and set for other bytes. Accordingly, if the functional bit corresponding to the end byte is clear, the instruction is a fast path instruction. Conversely, if the functional bit corresponding to the end byte is set, the instruction is an MROM instruction. The opcode of a fast path instruction may thereby be located within an instruction as the byte associated with the first clear functional bit in the instruction. For example, a fast path instruction including two prefix bytes, a Mod R/M byte, and an immediate byte would have start, end, and functional bits as follows:

Start bits 10000

End bits 00001

Functional bits 11000

According to one particular embodiment, early identification of an instruction that includes a scale-index-base (SIB) byte is advantageous for MROM unit 134. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 122. MROM instructions are executed by invoking MROM unit 134. More specifically, when an MROM instruction is encountered, MROM unit 134 parses and issues the instruction into a subset of defined fast path instructions to effectuate the desired operation. MROM unit 134 dispatches the subset of fast path instructions to decode units 122.

Processor 110 employs branch prediction in order to speculatively fetch instructions subsequent to conditional branch instructions. Branch prediction unit 118 is included to perform branch prediction operations. In one embodiment, branch prediction unit 118 employs a branch target buffer which stores up to two branch target addresses and corresponding taken/not taken predictions per 16-byte portion of a cache line in instruction cache 112. The branch target buffer may, for example, comprise 2048 entries or any other suitable number of entries.

Prefetch/predecode unit 116 may determine initial branch targets when a particular line is predecoded. Subsequent updates to the branch targets corresponding to a cache line may occur due to the execution of instructions within the cache line. Instruction cache 112 may provide an indication of the instruction address being fetched, so that branch prediction unit 118 may determine which branch target addresses to select for forming a branch prediction. Decode units 122 and functional units 126 may provide update information to branch prediction unit 118. Decode units 122 may detect branch instructions which were not predicted by branch prediction unit 118. Functional units 126 may execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction.

When a mispredicted branch instruction is detected, instructions subsequent to the mispredicted branch may be discarded from the various units of processor 110. In an alternative configuration, branch prediction unit 118 may be coupled to reorder buffer 132 instead of decode units 122 and functional units 126, and may receive branch misprediction information from reorder buffer 132. A variety of suitable branch prediction algorithms may be employed by branch prediction unit 118.

As instruction alignment unit 120 fetches instructions from instruction cache 112, the corresponding predecode data may be scanned to provide information to instruction alignment unit 120 (and to MROM unit 134) regarding the instructions being fetched. Instruction alignment unit 120 may utilize the scanning data to align an instruction to each of decode units 122. In one embodiment, instruction alignment unit 120 may align instructions from three sets of eight instruction bytes to decode units 122. Decode unit 122A may receive an instruction which is prior to instructions concurrently received by decode units 122B and 122C (in program order). Similarly, decode unit 122B may receive an instruction which is prior to the instruction concurrently received by decode unit 122C in program order.

Decode units 122 are configured to decode instructions received from instruction alignment unit 120. Register operand information may be detected and routed to register file 130 and reorder buffer 132. Additionally, if the instructions require one or more memory operations to be performed, decode units 122 may dispatch the memory operations to load/store units 128. Each instruction is decoded into a set of "control values" for functional units 126, and these control values are dispatched to reservation stations 124. Operand address information and displacement or immediate data which may be included with the instruction may be forwarded to reservation stations 124 along with the control values. In one particular embodiment, each instruction is decoded into a maximum of two operations which may be separately executed by functional units 126A–126C.

Processor 110 supports out of order instruction execution. Reorder buffer 132 is used to keep track of the original program sequence for register read and write operations, to implement register renaming, to allow for speculative instruction execution and branch misprediction recovery, and to facilitate precise exceptions. A temporary storage location within reorder buffer 132 may be reserved upon decode of an instruction that involves the update of a register to thereby store speculative register states. If a branch prediction is incorrect, the results of speculatively-executed instructions along the mispredicted path may be invalidated in the buffer before they are written to register file 130. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 132.

The instruction control values and immediate or displacement data provided at the outputs of decode units 122 may be routed directly to respective reservation stations 124. In one embodiment, each reservation station 124 is capable of holding instruction information (i.e., instruction control values as well as operand values, operand tags and/or immediate data) for up to five pending instructions awaiting issue to the corresponding functional unit. In the embodiment of FIG. 8, each reservation station 124 is associated with a dedicated functional unit 126. Accordingly, three dedicated "issue positions" are formed by reservation stations 124 and functional units 126. In other words, issue position 0 is formed by reservation station 124A and functional unit 126A. Instructions aligned and dispatched to reservation station 124A are executed by functional unit 126A. Similarly, issue position 1 is formed by reservation station 124B and functional unit 126B; and issue position 2 is formed by reservation station 124C and functional unit 126C.

Upon decode of a particular instruction, if a required operand is a register location, register address information is routed to reorder buffer 132 and register file 130 simultaneously. It is well known that the x86 register file includes eight 32-bit real registers (i.e., typically referred to as EAX, EBX, ECX, EDX, EBP, ESI, EDI and ESP). In embodiments of processor 110 which employ the x86 processor architecture, register file 130 may comprise storage locations for each of the 32-bit real registers. Additional storage locations may be included within register file 130 for use by MROM unit 134.

Reorder buffer 132 may contain temporary storage locations for results which change the contents of the real registers to thereby allow out of order instruction execution. A temporary storage location of reorder buffer 132 may be reserved for each instruction which, upon decode, is determined to modify the contents of one of the real registers. Therefore, at various points during execution of a particular program, reorder buffer 132 may have one or more locations which contain the speculatively executed contents of a given register.

If, following decode of a given instruction, it is determined that reorder buffer 132 has a previous location or locations assigned to a register used as an operand in the given instruction, reorder buffer 132 may forward to the corresponding reservation station either: 1) the value in the most recently assigned location, or 2) a tag for the most recently assigned location if the value has not yet been produced by the functional unit that will eventually execute the previous instruction. If reorder buffer 132 has a location reserved for a given register, the operand value (or reorder buffer tag) may be provided from reorder buffer 132 rather than from register file 130. If there is no location reserved for a required register in reorder buffer 132, the value may be taken directly from register file 130. If the operand corresponds to a memory location, the operand value may be provided to the reservation station through load/store units 128.

In one particular embodiment, reorder buffer 132 is configured to store and manipulate concurrently decoded instructions as a unit. This configuration will be referred to herein as "line-oriented". By manipulating several instructions together, the hardware employed within reorder buffer 132 may be simplified. For example, a line-oriented reorder buffer may be included in the present embodiment which allocates storage sufficient for instruction information pertaining to three instructions (one from each decode unit 122) whenever one or more instructions are dispatched by decode units 122. By contrast, a variable amount of storage may be allocated in conventional reorder buffers, dependent upon the number of instructions actually dispatched. A comparatively larger number of logic gates may be required to allocate the variable amount of storage.

When each of the concurrently decoded instructions has executed, the instruction results may be stored into register file 130 simultaneously. The storage is then free for allocation to another set of concurrently decoded instructions. Additionally, the amount of control logic circuitry employed per instruction may be reduced as the control logic is amortized over several concurrently decoded instructions. A reorder buffer tag identifying a particular instruction may be divided into two fields: a line tag and an offset tag. The line tag may identify the set of concurrently decoded instructions including the particular instruction, and the offset tag may identify which instruction within the set corresponds to the particular instruction. Storing instruction results into register file 130 and freeing the corresponding storage is referred to as "retiring" the instructions. It is noted that any reorder buffer configuration may be employed in various embodiments of processor 110.

As described above, reservation stations 124 store instructions until the instructions are executed by the corresponding functional unit 126. An instruction may be selected for execution if: (i) the operands of the instruction have been provided; and (ii) the operands have not yet been provided for instructions which are within the same reservation station 124A–124C and which are prior to the instruction in program order. It is noted that when an instruction is executed by one of the functional units 126, the result of that instruction may be passed directly to any reservation stations 124 that are waiting for that result at the same time the result is passed to update reorder buffer 132 (this technique is commonly referred to as "result forwarding"). An instruction may be selected for execution and passed to a functional unit 126A–126C during the clock cycle that the associated result is forwarded. Reservation stations 124 may route the forwarded result to the functional unit 126 in this case. In embodiments in which instructions may be decoded into multiple operations to be executed by functional units 126, the operations may be scheduled separately.

In one embodiment, each of the functional units 126 is configured to perform integer arithmetic operations of addition and subtraction, as well as shifts, rotates, logical operations, and branch operations. The operations are performed in response to the control values decoded for a particular instruction by decode units 122. It is noted that a floating point unit (not shown) may also be employed to accommodate floating point operations. The floating point unit may be operated as a coprocessor, receiving instructions from MROM unit 134 or reorder buffer 132 and subsequently communicating with reorder buffer 132 to complete the instructions. Additionally, functional units 126 may be configured to perform address generation for load and store memory operations performed by load/store units 128. In one particular embodiment, each functional unit 126 may comprise an address generation unit for generating addresses and an execute unit for performing the remaining functions. The two units may operate independently upon different instructions or operations during a clock cycle.

Each of the functional units 126 may also provide information regarding the execution of conditional branch instructions to the branch prediction unit 118. If a branch prediction was incorrect, branch prediction unit 118 may flush instructions subsequent to the mispredicted branch that have entered the instruction processing pipeline, and initiate the fetching of required instructions from instruction cache 112 or main memory. It is noted that in such situations, results of instructions in the original program sequence which occur after the mispredicted branch instruction may be discarded, including those which were speculatively executed and temporarily stored in the load/store units 128 and reorder buffer 132. It is further noted that branch execution results may be provided by functional units 126 to reorder buffer 132, which may indicate branch mispredictions to functional units 126.

Results produced by functional units 126 may be sent to reorder buffer 132 if a register value is being updated, and to load/store units 128 if the contents of a memory location are changed. If the result is to be stored in a register, reorder buffer 132 may store the result in the location reserved for the value of the register when the instruction was decoded. The multiple result buses 136 are used to transport results from functional units 126 to reorder buffer 132 and to load/store units 128. Result buses 136 convey the result generated, as well as the reorder buffer tag identifying the instruction being executed.

Load/store units 128 provide an interface between functional units 126 and data cache 114. In one embodiment, each load/store unit 128 is configured with a first load/store buffer having storage locations for data and address information for pending loads or stores which have not accessed data cache 114 and a second load/store buffer having storage locations for data and address information for loads and stores which have access data cache 114. For example, the first buffer may comprise 12 locations and the second buffer may comprise 32 locations. Decode units 122 may arbitrate for access to one of the load/store units 128. When the first buffer is full, a decode unit may wait until one of the load/store units 128 has room for the pending load or store request information.

Load/store units 128 may also perform dependency checking for load memory operations against pending store memory operations to ensure that data coherency is maintained. A memory operation is a transfer of data between processor 110 and the L2 cache or main memory 106 via BIU 104. Memory operations may be the result of an instruction which utilizes an operand stored in memory, or may be the result of a load/store instruction which causes the data transfer but no other operation. Additionally, load/store units 128 may include a special register storage for special registers such as the segment registers and other registers related to the address translation mechanism defined by the x86 processor architecture.

Data cache 114 is a high speed cache memory provided to temporarily store data being transferred between load/store units 128 and the L2 cache or main memory 106. In one embodiment, data cache 114 has a capacity of storing up to 64 kilobytes of data in an two-way set associative structure. It is understood that data cache 114 may be implemented in a variety of specific memory configurations, including a set associative configuration, a fully associative configuration, a direct-mapped configuration, and any suitable size of any other configuration.

BIU 104 is coupled to the bus, and is configured to communicate between processor 110 and other components also coupled to the bus via the bus. For example, the bus may be compatible with the EV-6 bus developed by Digital Equipment Corporation. Alternatively, any suitable interconnect structure may be used including packet-based, unidirectional or bidirectional links, etc. An optional L2 cache interface may be included within BIU 104 for interfacing to the L2 cache.

Figure 9:
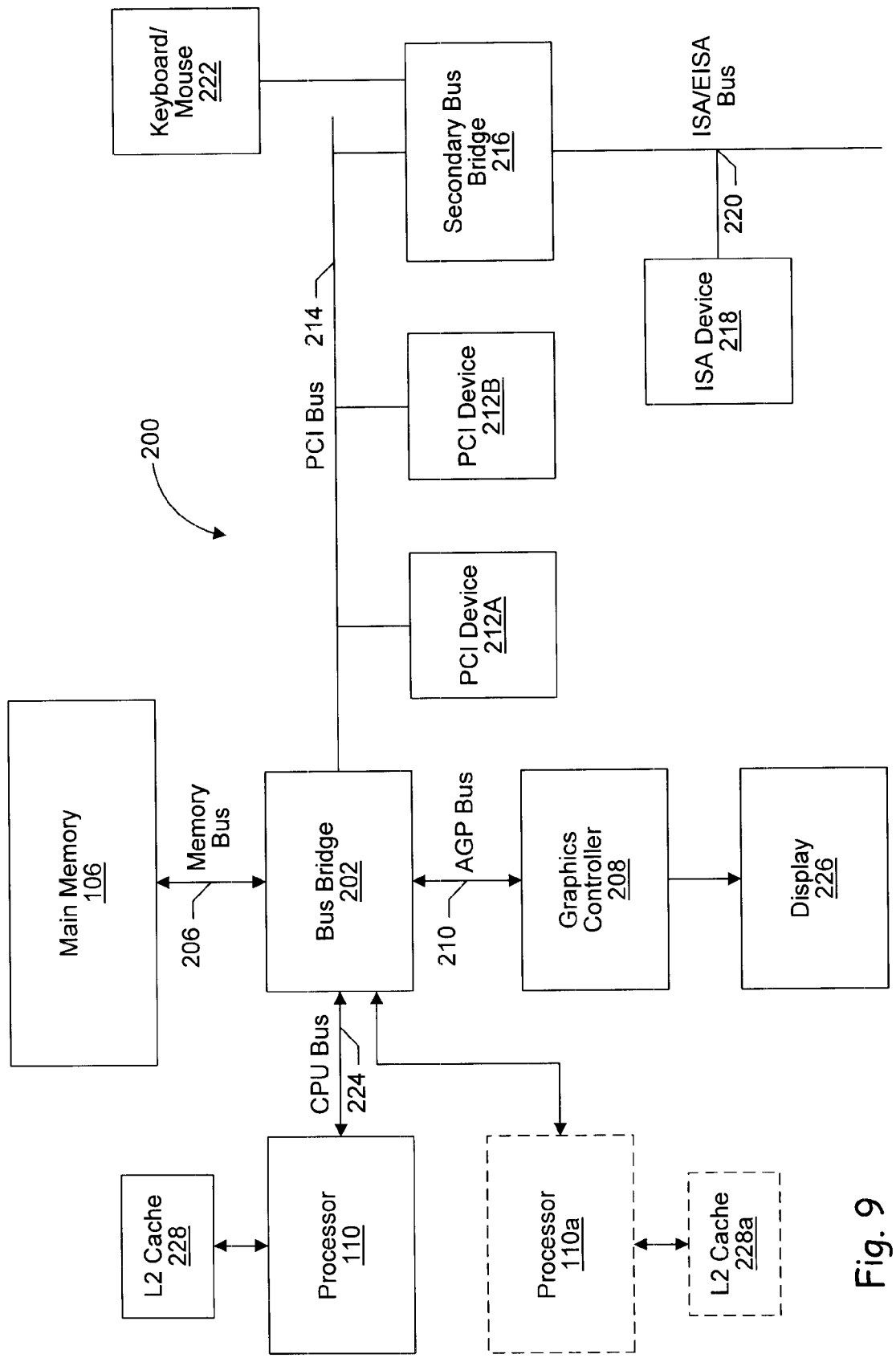
FIG. 9 is a block diagram of one embodiment of a computer system including the processor of FIG. 8.

FIG. 9 is a block diagram of one embodiment of a computer system 200 including processor 110. In the embodiment of FIG. 8, data cache 114 of processor 110 includes TLB 22 as described above. Processor 110 is coupled to a variety of system components through a bus bridge 202. Other embodiments of computer system 200 are possible and contemplated.

In the embodiment of FIG. 9, main memory 106 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a peripheral component interconnect (PCI) bus 214. A secondary bus bridge 216 may further be provided to accommodate an electrical interface to one or more EISA or ISA devices 218 through an extended industry standard architecture (EISA)/industry standard architecture (ISA) bus 220. Processor 110 is coupled to bus bridge 202 through a CPU bus 224 and to an optional L2 cache 228.

Bus bridge 202 provides an interface between processor 110, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 110 and bus bridge 202 in other embodiments. Alternatively, the external cache may be coupled to bus bridge 202 and cache control logic for the external cache may be integrated into bus bridge 202. L2 cache 228 is further shown in a backside configuration to processor 110. It is noted that L2 cache 228 may be separate from processor 110, integrated into a cartridge (e.g. slot 1 or slot A) with processor 110, or even integrated onto a semiconductor substrate with processor 110.

Main memory 106 is used to store software instructions and data (i.e., data items) as described above. A suitable main memory 106 comprises dynamic random access memory (DRAM). For example, a plurality of banks of synchronous DRAM (SDRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, small computer systems interface (SCSI) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the PCI, AGP, and EISA/ISA buses have been used as examples in the above description, any bus architectures may be substituted as desired. It is further noted that computer system 200 may be a multiprocessing computer system including additional processors (e.g. processor 110a shown as an optional component of computer system 200). Processor 110a may be similar to processor 110, or processor 110a may be an identical copy of processor 110. Processor 110a may be connected to bus bridge 202 via an independent bus (as shown in FIG. 9) or may share CPU bus 224 with processor 110. Furthermore, processor 110a may be coupled to an optional L2 cache 228a similar to L2 cache 228.

It is noted that while certain embodiments have been described above as employing the x86 instruction set, any other instruction set architecture which employs virtual-to-physical address translation may employ the above described features.

Numerous variations and modifications will become apparent to those skilled in the art once the above disclosure is fully appreciated. It is intended that the following claims be interpreted to embrace all such variations and modifications.

What is claimed is:

1. A memory unit, comprising:
   a memory subunit including n entry locations for storing data items, wherein $n \geq 2$, and wherein the memory unit generates a first signal indicating which of the n entry locations are currently in use, and wherein the memory subunit is coupled to receive a new data item and a control signal, and wherein the control signal identifies one of the n entry locations in which the new data item is to be stored;
   circuitry coupled to the memory subunit for determining if the memory subunit contains a needed data item, wherein the circuitry produces a second signal indicating which of the n entry locations contains the needed data item;
   a control unit coupled to receive the first and second signals and configured to produce the control signal dependent upon the first and second signals, and wherein the control signal identifies either: (i) one of the n entry locations not currently in use, or (ii) a least recently used one of the n entry locations.

2. The memory unit as recited in claim 1, wherein each of the n entry locations is identified by a unique identifier, and wherein the control unit maintains a list of the unique identifiers of the n entry locations in chronological order of needed data items being found within each of the n entry locations.

3. The memory unit as recited in claim 2, wherein the control unit maintains the list dependent upon the second signal.

4. The memory unit as recited in claim 1, wherein the least recently used one of the n entry locations is the entry location in which a needed data item has not been found for the longest period of time.

5. The memory unit as recited in claim 1, wherein the new data item is provided to the memory subunit if the needed data item is not found within the memory subunit.

6. The memory unit as recited in claim 1, wherein if the first signal indicates that at least one of the n entry locations is not currently in use, the control signal identifies one of the n entry locations not currently in use.

7. The memory unit as recited in claim 1, wherein if all of the n entry locations are in use, the control signal indicates the least recently used one of the n entry locations.

8. A memory unit, comprising:
   a first memory subunit including n entry locations for storing data items, wherein $n \geq 22$, and wherein the memory unit generates a first signal indicating which of the n entry locations are currently in use, and wherein the first memory subunit is coupled to receive a new data item and a control signal, and wherein the control signal identifies one of the n entry locations in which the new data item is to be stored;
   circuitry coupled to the first memory subunit for determining if the first memory subunit contains a needed data item, wherein the circuitry produces a second signal indicating which of the n entry locations of the first memory subunit contains the needed data item;
   a control unit coupled to receive the first and second signals and configured to produce the control signal dependent upon the first and second signals, wherein the control unit comprises a second memory subunit including n entry locations, and wherein each of the n entry locations of the second memory subunit stores an identifier uniquely identifying a different one of the n entry locations of the first memory subunit;
   wherein the control unit adjusts the relative locations of the identifiers within the n entry locations of the second memory subunit dependent upon the second signal such that the identifiers are maintained in chronological order of needed data items being found within each of the n entry locations of the first memory subunit;
   wherein if the first signal indicates that at least one of the n entry locations of the first memory subunit is not currently in use, the control signal identifies one of the n entry locations of the first memory subunit not currently in use; and
   wherein if all of the n entry locations of the first memory subunit are in use, the control signal indicates a least recently used one of the n entry locations of the first memory subunit.

9. The memory unit as recited in claim 8, wherein the least recently used one of the n entry locations of the first memory subunit is the entry location of the first subunit in which a needed data item has not been found for the longest period of time.

10. The memory unit as recited in claim 8, wherein each of the n entry locations of the first memory subunit is assigned a different number, and each of the n entry locations of the second memory subunit stores a number assigned to a different one of the n entry locations of the first memory subunit.

11. A memory unit, comprising:
  a memory subunit including:
    a tag array having n entry locations for storing a tag portion of an address, wherein the tag portion of the address is the higher ordered b bits of the address, and wherein $2 \leq n < 2^b$;
    a data array having n sets of $2^m$ entry locations for storing a data item, wherein each of the n sets is associated with a different one of the n entry locations of the tag array, and wherein each of the $2^m$ entry locations within a given set is accessed using an m-bit index portion of the address;
    a valid bit array for storing n valid bits, wherein each valid bit is associated with a different one of the n entry locations of the tag array and has a value indicating if the tag portion of the address stored within the associated entry location of the tag array is valid;
    wherein the memory unit generates a first signal including the values of the n valid bits of the valid bit array; and
    wherein the memory unit is coupled to receive a new data item and a control signal, and wherein the new data item comprises a data item and an address of the data item, and wherein the control signal identifies one of the n entry locations of the tag array in which a tag portion of the address is to be stored;
  circuitry coupled to the memory unit for determining if the memory unit contains a needed data item, wherein the circuitry produces a second signal indicating which of the n entry locations of the tag array is associated with the data array set containing the needed data item;
  a control unit coupled to receive the first and second signals and configured to produce the control signal dependent upon the first and second signals, wherein the control unit comprises a second memory unit including n entry locations, and wherein each of the n entry locations of the second memory unit stores an identifier uniquely identifying a different one of the n entry locations of the tag array of the first memory unit;
  wherein the control unit adjusts the relative locations of the identifiers within the n entry locations of the second memory unit dependent upon the second signal such that the identifiers are maintained in chronological order of needed data items being found within the data array set associated with each of the n entry locations of the tag array;
  wherein if the first signal indicates that at least one of the n entry locations of the tag array is not currently in use, the control signal identifies one of the n entry locations of the tag array not currently in use as the entry location of the tag array in which the tag portion of the address of the new data item is to be stored; and
  wherein if all of the n entry locations of the tag array are in use, the control signal indicates a least recently used one of the n entry locations of the tag array as the entry location of the tag array in which the tag portion of the address of the new data item is to be stored.

12. The memory unit as recited in claim 11, wherein the least recently used one of the n entry locations of the tag array is the entry location of the tag array associated with the data array set in which a needed data item has not been found for the longest period of time.

13. The memory unit as recited in claim 11, wherein each of the n entry locations of the tag array of the first memory unit is assigned a different number, and each of the n entry locations of the second memory unit stores a number assigned to a different one of the n entry locations of the tag array of the first memory unit.

14. The memory unit as recited in claim 11, wherein $m \geq 0$.

15. The memory unit as recited in claim 11, wherein n=32 and m =0.

16. The memory unit as recited in claim 11, wherein the m-bit index portion of the address is the lower-ordered m bits of the address.

17. The memory unit as recited in claim 11, wherein the control unit comprises:
  least recently used (LRU) logic coupled to the second memory unit, wherein the LRU logic receives the second signal, adjusts the relative locations of the identifiers within the n entry locations of the second memory unit dependent upon the second signal, and produces an LRUE signal indicating the least recently used one of the n entry locations of the tag array;
  invalid entry locator logic coupled to receive the first signal and configured to produce: (i) an EE signal indicating the presence or absence of at least one of the n entry locations of the tag array not currently in use, and (ii) an FIE signal identifying one of the n entry locations of the tag array not currently in use; and
  selection logic coupled to receive the LRUE, EE, and FIE signals and configured to produce either the LRUE signal or the FIE signal as the control signal dependent upon the EE signal.

18. The memory unit as recited in claim 17, wherein the EE signal is asserted if at least one of the n entry locations of the tag array not currently in use, and wherein the selection logic produces the LRUE signal when FE signal is deasserted, and wherein the selection logic produces the FIE signal when the EE signal is asserted.

19. A translation lookaside buffer, comprising:
  a first memory unit including:
    a tag array having n entry locations for storing a b-bit virtual page number portion of a virtual address, wherein $2 \leq n < 2^b$;
    a data array having n entry locations for storing a translated portion of a physical address, wherein each of the n entry locations is associated with a different one of the n entry locations of the tag array;
    a valid bit array for storing n valid bits, wherein each of the n valid bits is associated with a different one of the n entry locations of the tag array and has a value indicating if the contents of the associated entry location of the tag array is valid;
    wherein the first memory unit generates a first signal including the values of the n valid bits of the valid bit array; and
    wherein the first memory unit is coupled to receive a new data item and a control signal, and wherein the new data item comprises a virtual page number portion of a virtual address and a corresponding translated portion of a physical address, and wherein the control signal identifies one of the n entry locations of the tag array in which the virtual page number portion of the virtual address is to be stored;
  circuitry coupled to the first memory unit for determining if the first memory unit contains a needed translated portion of a physical address, wherein the circuitry produces a second signal indicating which of the n entry locations of the tag array is associated with the entry location of the data array containing the needed translated portion of the physical address;

a control unit coupled to receive the first and second signals and configured to produce the control signal dependent upon the first and second signals, wherein the control unit comprises a second memory unit including n entry locations, and wherein each of the n entry locations of the second memory unit stores an identifier uniquely identifying a different one of the n entry locations of the tag array of the first memory unit;

wherein the control unit adjusts the relative locations of the identifiers within the n entry locations of the second memory unit dependent upon the second signal such that the identifiers are maintained in chronological order of needed translated portions of physical addresses being found within the entry location of the data array associated with each of the n entry locations of the tag array;

wherein if the first signal indicates that at least one of the n entry locations of the tag array is not currently in use, the control signal identifies one of the n entry locations of the tag array not currently in use as the entry location of the tag array in which the virtual page number portion of the virtual address of the new data item is to be stored; and wherein if all of the n entry locations of the tag array are in use, the control signal indicates a least recently used one of the n entry locations of the tag array as the entry location of the tag array in which the virtual page number portion of the virtual address of the new data item is to be stored.

20. The translation lookaside buffer as recited in claim 19, wherein the least recently used one of the n entry locations of the tag array is the entry location of the tag array associated with the entry location of the data array in which a needed translated portion of a physical address has not been found for the longest period of time.

21. The translation lookaside buffer as recited in claim 19, wherein each of the n entry locations of the tag array of the first memory unit is assigned a different number, and each of the n entry locations of the second memory unit stores a number assigned to a different one of the n entry locations of the tag array of the first memory unit.

22. The translation lookaside buffer as recited in claim 19, wherein n=32.

23. The translation lookaside buffer as recited in claim 19, wherein the b-bit virtual page number portion of a virtual address comprises the highest-ordered b bits of the virtual address.

24. The translation lookaside buffer as recited in claim 19, wherein the control unit comprises:

least recently used (LRU) logic coupled to the second memory unit, wherein the LRU logic receives the second signal, adjusts the relative locations of the identifiers within the n entry locations of the second memory unit dependent upon the second signal, and produces an LRUE signal indicating the least recently used one of the n entry locations of the tag array;

invalid entry locator logic coupled to receive the first signal and configured to produce: (i) an EE signal indicating the presence or absence of at least one of the n entry locations of the tag array not currently in use, and (ii) an FIE signal identifying one of the n entry locations of the tag array not currently in use; and selection logic coupled to receive the LRUE, EE, and FIE signals and configured to produce either the LRUE signal or the FIE signal as the control signal dependent upon the EE signal.

25. The translation lookaside buffer as recited in claim 24, wherein the EE signal is asserted if at least one of the n entry locations of the tag array is not currently in use, and wherein the selection logic produces the LRUE signal when the EE signal is deasserted, and wherein the selection logic produces the FIE signal when the EE signal is asserted.

26. A dual port translation lookaside buffer, comprising:

a first port for receiving a first virtual address;

a second port for receiving a second virtual address;

a first memory unit including:
  a tag array having n entry locations for storing a b-bit virtual page number portion of a virtual address, wherein $2 \leq n < 2^b$;
  a data array having n entry locations for storing a translated portion of a physical address, wherein each of the n entry locations is associated with a different one of the n entry locations of the tag array;
  a valid bit array for storing n valid bits, wherein each of the n valid bits is associated with a different one of the n entry locations of the tag array and has a value indicating if the contents of the associated entry location of the tag array is valid;
  wherein the first memory unit generates a first signal including the values of the n valid bits of the valid bit array; and
  wherein the first memory unit is coupled to receive a new data item and a control signal, and wherein the new data item comprises a virtual page number portion of a virtual address and a corresponding translated portion of a physical address, and wherein the control signal identifies one of the n entry locations of the tag array in which the virtual page number portion of the virtual address is to be stored;

a first set of circuitry coupled to the first memory unit for determining if the first memory unit contains a needed translated portion of a physical address corresponding to the first virtual address, wherein the first set of circuitry produces a second signal indicating which of the n entry locations of the tag array is associated with the entry location of the data array containing the needed translated portion of the physical address corresponding to the first virtual address;

a second set of circuitry coupled to the first memory unit for determining if the first memory unit contains a needed translated portion of a physical address corresponding to the second virtual address, wherein the second set of circuitry produces a third signal indicating which of the n entry locations of the tag array is associated with the entry location of the data array containing the needed translated portion of the physical address corresponding to the second virtual address;

a control unit coupled to receive the first, second, and third signals and configured to produce the control signal dependent upon the first, second, and third signals, wherein the control unit comprises a second memory unit including n entry locations, and wherein each of the n entry locations of the second memory unit stores an identifier uniquely identifying a different one of the n entry locations of the tag array of the first memory unit;

wherein the control unit adjusts the relative locations of the identifiers within the n entry locations of the second memory unit dependent upon the second and third signals such that the identifiers are maintained in chronological order of needed translated portions of physical addresses being found within the entry location of the data array associated with each of the n entry locations of the tag array;

wherein if the first signal indicates that at least one of the n entry locations of the tag array is not currently in use, the control signal identifies one of the n entry locations of the tag array not currently in use as the entry location of the tag array in which the virtual page number portion of the virtual address of the new data item is to be stored; and wherein if all of the n entry locations of the tag array are in use, the control signal indicates a least recently used one of the n entry locations of the tag array as the entry location of the tag array in which the virtual page number portion of the virtual address of the new data item is to be stored.

27. The dual port translation lookaside buffer as recited in claim 26, wherein the least recently used one of the n entry locations of the tag array is the entry location of the tag array associated with the entry location of the data array in which a needed translated portion of a physical address has not been found for the longest period of time.

28. The dual port translation lookaside buffer as recited in claim 26, wherein each of the n entry locations of the tag array of the first memory unit is assigned different number, and each of the n entry locations of the second memory unit stores a number assigned to a different one of the n entry locations of the tag array of the first memory unit.

29. The dual port translation lookaside buffer as recited in claim 26, wherein n=32.

30. The dual port translation lookaside buffer as recited in claim 26, wherein the control unit comprises:

least recently used (LRU) logic coupled to the second memory unit, wherein the LRU logic receives the second and third signals, adjusts the relative locations of the identifiers within the n entry locations of the second memory unit dependent upon the second and third signals, and produces an LRUE signal indicating the least recently used one of the n entry locations of the tag array;

invalid entry locator logic coupled to receive the first signal and configured to produce: (i) an EE signal indicating the presence or absence of at least one of the n entry locations of the tag array not currently in use, and (ii) an FIE signal identifying one of the n entry locations of the tag array not currently in use; and selection logic coupled to receive the LRUE, EE, and FIE signals and configured to produce either the LRUE signal or the FIE signal as the control signal dependent upon the EE signal.

31. The dual port translation lookaside buffer as recited in claim 30, wherein the EE signal is asserted if at least one of the n entry locations of the tag array is not currently in use, and wherein the selection logic produces the LRUE signal when the EE signal is deasserted, and wherein the selection logic produces the FIE signal when the EE signal is asserted.

32. A cache unit, comprising:

a cache memory for storing a plurality of data items and corresponding physical addresses, wherein the cache memory is configured to produce one of the plurality of data items when provided with the corresponding physical address of the data item; and a translation lookaside buffer (TLB) coupled to the cache memory and adapted for storing a plurality of virtual addresses and corresponding physical addresses, wherein the TLB is coupled to receive a virtual address and configured to produce a physical address corresponding to the virtual address and to provide the physical address to the cache memory, wherein the TLB comprises:

a first memory unit including:

a tag array having n entry locations for storing a b-bit virtual page number portion of a virtual address, wherein $2 \leq n < 2^b$;

a data array having n entry locations for storing a translated portion of a physical address, wherein each of the n entry locations is associated with a different one of the n entry locations of the tag array;

a valid bit array for storing n valid bits, wherein each of the n valid bits is associated with a different one of the n entry locations of the tag array and has a value indicating if the contents of the associated entry location of the tag array is valid;

wherein the first memory unit generates a first signal including the values of the n valid bits of the valid bit array; and wherein the first memory unit is coupled to receive a new data item and a control signal, and wherein the new data item comprises a virtual page number portion of a virtual address and a corresponding translated portion of a physical address, and wherein the control signal identifies one of the n entry locations of the tag array in which the virtual page number portion of the virtual address is to be stored;

circuitry coupled to the first memory unit for determining if the first memory unit contains a needed translated portion of a physical address, wherein the circuitry produces a second signal indicating which of the n entry locations of the tag array is associated with the entry location of the data array containing the needed translated portion of the physical address;

a control unit coupled to receive the first and second signals and configured to produce the control signal dependent upon the first and second signals, wherein the control unit comprises a second memory unit including n entry locations, and wherein each of the n entry locations of the second memory unit stores an identifier uniquely identifying a different one of the n entry locations of the tag array of the first memory unit;

wherein the control unit adjusts the relative locations of the identifiers within the n entry locations of the second memory unit dependent upon the second signal such that the identifiers are maintained in chronological order of needed translated portions of physical addresses being found within the entry location of the data array associated with each of the n entry locations of the tag array;

wherein if the first signal indicates that at least one of the n entry locations of the tag array is not currently in use, the control signal identifies one of the n entry locations of the tag array not currently in use as the entry location of the tag array in which the virtual page number portion of the virtual address of the new data item is to be stored; and wherein if all of the n entry locations of the tag array are in use, the control signal indicates a least recently used one of the n entry locations of the tag array as the entry location of the tag array in which the virtual page number portion of the virtual address of the new data item is to be stored.

33. The cache unit as recited in claim 32, wherein the least recently used one of the n entry locations of the tag array is the entry location of the tag array associated with the entry location of the data array in which a needed translated portion of a physical address has not been found for the longest period of time.

34. A processor, comprising:
a cache unit for storing a plurality of data items, wherein the cache unit is configured to produce a data item when provided with a virtual address corresponding to a physical address of the data item, and wherein the cache unit comprises:
a cache memory for storing the plurality of data items and corresponding physical addresses, wherein the cache memory is configured to produce one of the plurality of data items when provided with the corresponding physical address of the data item; and
a translation lookaside buffer (TLB) coupled to the cache memory and adapted for storing a plurality of virtual addresses and corresponding physical addresses, wherein the TLB is coupled to receive the virtual address provided to the cache unit and configured to produce the physical address corresponding to the virtual address, and to provide the physical address to the cache memory, wherein the TLB comprises:
a first memory unit including:
a tag array having n entry locations for storing a b-bit virtual page number portion of a virtual address, wherein $2 \leq n < 2^b$;
a data array having n entry locations for storing a translated portion of a physical address, wherein each of the n entry locations is associated with a different one of the n entry locations of the tag array;
a valid bit array for storing n valid bits, wherein each of the n valid bits is associated with a different one of the n entry locations of the tag array and has a value indicating if the contents of the associated entry location of the tag array is valid;
wherein the first memory unit generates a first signal including the values of the n valid bits of the valid bit array; and
wherein the first memory unit is coupled to receive a new data item and a control signal, and wherein the new data item comprises a virtual page number portion of a virtual address and a corresponding translated portion of a physical address, and wherein the control signal identifies one of the n entry locations of the tag array in which the virtual page number portion of the virtual address is to be stored;
circuitry coupled to the first memory unit for determining if the first memory unit contains a needed translated portion of a physical address, wherein the circuitry produces a second signal indicating which of the n entry locations of the tag array is associated with the entry location of the data array containing the needed translated portion of the physical address;
a control unit coupled to receive the first and second signals and configured to produce the control signal dependent upon the first and second signals, wherein the control unit comprises a second memory unit including n entry locations, and wherein each of the n entry locations of the second memory unit stores an identifier uniquely identifying a different one of the n entry locations of the tag array of the first memory unit;
wherein the control unit adjusts the relative locations of the identifiers within the n entry locations of the second memory unit dependent upon the second signal such that the identifiers are maintained in chronological order of needed translated portions of physical addresses being found within the entry location of the data array associated with each of the n entry locations of the tag array;
wherein if the first signal indicates that at least one of the n entry locations of the tag array is not currently in use, the control signal identifies one of the n entry locations of the tag array not currently in use as the entry location of the tag array in which the virtual page number portion of the virtual address of the new data item is to be stored; and
wherein if all of the n entry locations of the tag array are in use, the control signal indicates a least recently used one of the n entry locations of the tag array as the entry location of the tag array in which the virtual page number portion of the virtual address of the new data item is to be stored.

35. The processor as recited in claim 34, wherein the least recently used one of the n entry locations of the tag array is the entry location of the tag array in which a needed translated portion of a physical address has not been found for the longest period of time.

36. A computer system, comprising:
a processor for executing instructions, including:
a cache unit for storing a plurality of data items, wherein the cache unit is configured to produce a data item when provided with a virtual address corresponding to a physical address of the data item, and wherein the cache unit comprises:
a cache memory for storing the plurality of data items and corresponding physical addresses, wherein the cache memory is configured to produce one of the plurality of data items when provided with the corresponding physical address of the data item; and
a translation lookaside buffer (TIB) coupled to the cache memory and adapted for storing a plurality of virtual addresses and corresponding physical addresses, wherein the TLB is coupled to receive the virtual address provided to the cache unit and configured to: (i) produce a physical address corresponding to the virtual address, and (ii) provide the physical address to the cache memory, wherein the TLB comprises:
a first memory unit including:
a tag array having n entry locations for storing a b-bit virtual page number portion of a virtual address, wherein $2 \leq n < 2^b$;
a data array having n entry locations for storing a translated portion of a physical address, wherein each of the n entry locations is associated with a different one of the n entry locations of the tag array;
a valid bit array for storing n valid bits, wherein each of the n valid bits is associated with a different one of the n entry locations of the tag array and has a value indicating if the contents of the associated entry location of the tag array is valid;
wherein the first memory unit generates a first signal including the values of the n valid bits of the valid bit array; and
wherein the first memory unit is coupled to receive a new data item and a control signal, and wherein the new data item comprises a virtual page number portion of a virtual address and a corresponding translated portion of a physical address, and wherein the control signal identifies one of the n entry locations of the tag array in which the virtual page number portion of the virtual address is to be stored;

circuitry coupled to the first memory unit for determining if the first memory unit contains a needed translated portion of a physical address, wherein the circuitry produces a second signal indicating which of the n entry locations of the tag array is associated with the entry location of the data array containing the needed translated portion of the physical address;

a control unit coupled to receive the first and second signals and configured to produce the control signal dependent upon the first and second signals, wherein the control unit comprises a second memory unit including n entry locations, and wherein each of the n entry locations of the second memory unit stores an identifier uniquely identifying a different one of the n entry locations of the tag array of the first memory unit;

wherein the control unit adjusts the relative locations of the identifiers within the n entry locations of the second memory unit dependent upon the second signal such that the identifiers are maintained in chronological order of needed translated portions of physical addresses being found within the entry location of the data array associated with each of the n entry locations of the tag array;

wherein if the first signal indicates that at least one of the n entry locations of the tag array is not currently in use, the control signal identifies one of the n entry locations of the tag array not currently in use as the entry location of the tag array in which the virtual page number portion of the virtual address of the new data item is to be stored; and wherein if all of the n entry locations of the tag array are in use, the control signal indicates a least recently used one of the n entry locations of the tag array as the entry location of the tag array in which the virtual page number portion of the virtual address of the new data item is to be stored.

37. The computer system as recited in claim 36, wherein the least recently used one of the n entry locations of the tag array is the entry location of the tag array in which a needed translated portion of a physical address has not been found for the longest period of time.

38. The computer system as recited in claim 36, further comprising:

a bus coupled to the processor, and a peripheral device coupled to the bus.

39. The computer system as recited in claim 38, wherein the bus is a peripheral component interconnect (PCI) bus, and wherein the peripheral device is selected from the group consisting of: a network interface card, a video accelerator, an audio card, a hard disk drive, and a floppy disk drive.

40. The computer system as recited in claim 38, wherein the bus is an extended industry standard architecture (EISA)/industry standard architecture (ISA) bus, and wherein the peripheral device is selected from the group consisting of: a modem, a sound card, and a data acquisition card.

* * * * *

UNITED STATES PATENT AND TRADEMARK OFFICE
CERTIFICATE OF CORRECTION

PATENT NO.    : 6,453,387 B1
DATED         : September 17, 2002
INVENTOR(S)   : Leonel Lozano It is certified that error appears in the above-identified patent and that said Letters Patent is hereby corrected as shown below:

Column 30,
Line 32, please change "FE" to -- EE --.

Signed and Sealed this

Twenty-eighth Day of January, 2003

JAMES E. ROGAN
*Director of the United States Patent and Trademark Office*